(12) United States Patent
Destraves et al.

(10) Patent No.: US 12,296,624 B2
(45) Date of Patent: May 13, 2025

(54) TIRE COMPRISING A RADIOFREQUENCY TRANSPONDER

(71) Applicant: COMPAGNIE GENERALE DES ETABLISSEMENTS MICHELIN, Clermont-Ferrand (FR)

(72) Inventors: Julien Destraves, Clermont-Ferrand (FR); Pierre Guinault, Clermont-Ferrand (FR); Michel Robert, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 228 days.

(21) Appl. No.: 17/782,275

(22) PCT Filed: Dec. 2, 2020

(86) PCT No.: PCT/FR2020/052242
§ 371 (c)(1),
(2) Date: Jun. 3, 2022

(87) PCT Pub. No.: WO2021/111075
PCT Pub. Date: Jun. 10, 2021

(65) Prior Publication Data
US 2023/0014878 A1   Jan. 19, 2023

(30) Foreign Application Priority Data
Dec. 4, 2019   (FR) ...................................... 1913726

(51) Int. Cl.
*B60C 19/00*   (2006.01)
*B29D 30/00*   (2006.01)
(Continued)

(52) U.S. Cl.
CPC .......... *B60C 19/00* (2013.01); *B29D 30/0061* (2013.01); *B60C 9/04* (2013.01);
(Continued)

(58) Field of Classification Search
CPC .. B60C 11/243; B60C 2019/004; B60C 19/00
See application file for complete search history.

(56) References Cited

U.S. PATENT DOCUMENTS

| 7,492,328 B2 | 2/2009 | Kish et al. |
| 9,114,671 B2 | 8/2015 | Adamson et al. |

(Continued)

FOREIGN PATENT DOCUMENTS

| EP | 1977912 A1 | 10/2008 | |
| EP | 1615784 B1 * | 1/2011 | ......... B60C 23/0408 |

(Continued)

OTHER PUBLICATIONS

International Search Report dated Jan. 26, 2021, in corresponding PCT/FR2020/052242 (4 pages).

*Primary Examiner* — Cedrick S Williams
(74) *Attorney, Agent, or Firm* — VENABLE LLP

(57) ABSTRACT

A tire fitted with a transponder comprises: a crown comprising a crown reinforcement having an axial end at each of its edges, connected at each of its axial ends by a sidewall to a bead having an interior end; a carcass reinforcement layer formed of parallel reinforcers, which is anchored in each bead around a bead wire to form a main part and a turn-up; the transponder comprising a core defining a first axis, a first cover filament helically twisted around the core and an electrical insulation device; and the first cover filament comprising at least two conductive filamentary elements galvanically connected to an electronic chip comprising a radiofrequency transmission-reception component. The thickness of elastomeric compound separating the outer (Continued)

cover filament, located radially outermost with respect to the first axis, and the reinforcements is greater than 0.5 millimeters.

15 Claims, 10 Drawing Sheets

(51) Int. Cl.
  *B60C 9/04* (2006.01)
  *B60C 11/24* (2006.01)
  *H01Q 1/22* (2006.01)

(52) U.S. Cl.
  CPC ... *H01Q 1/2241* (2013.01); *B29D 2030/0083* (2013.01); *B60C 2019/004* (2013.01)

(56) References Cited

U.S. PATENT DOCUMENTS

| | | | |
|---|---|---|---|
| 9,490,531 | B2 | 11/2016 | Robert et al. |
| 9,496,618 | B2 | 11/2016 | Robert et al. |
| 10,339,435 | B2 | 7/2019 | Destraves |
| 10,850,577 | B2 | 12/2020 | Allement et al. |
| 10,974,553 | B2 | 4/2021 | Destraves et al. |
| 11,018,406 | B2 | 5/2021 | Destraves et al. |
| 11,152,684 | B2 | 10/2021 | Destraves et al. |
| 11,170,283 | B2 | 11/2021 | Sams et al. |
| 11,548,331 | B2 | 1/2023 | Destraves et al. |
| 11,679,571 | B2 | 6/2023 | Bestgen et al. |
| 2008/0289736 | A1 | 11/2008 | Adamson et al. |
| 2019/0322142 | A1* | 10/2019 | Lallement ............ B60C 17/0009 |
| 2020/0062050 | A1 | 2/2020 | Destraves et al. |
| 2020/0079159 | A1* | 3/2020 | Destraves ............ H01Q 1/2241 |
| 2021/0197631 | A1 | 7/2021 | Fagot-Revurat et al. |
| 2021/0252815 | A1 | 8/2021 | Bestgen et al. |
| 2022/0388354 | A1 | 12/2022 | Destraves et al. |

FOREIGN PATENT DOCUMENTS

| | | |
|---|---|---|
| WO | 2018/104619 A1 | 6/2018 |
| WO | 2018/104620 A1 | 6/2018 |
| WO | 2019/175509 A1 | 9/2019 |
| WO | 2019/220063 A2 | 11/2019 |

* cited by examiner

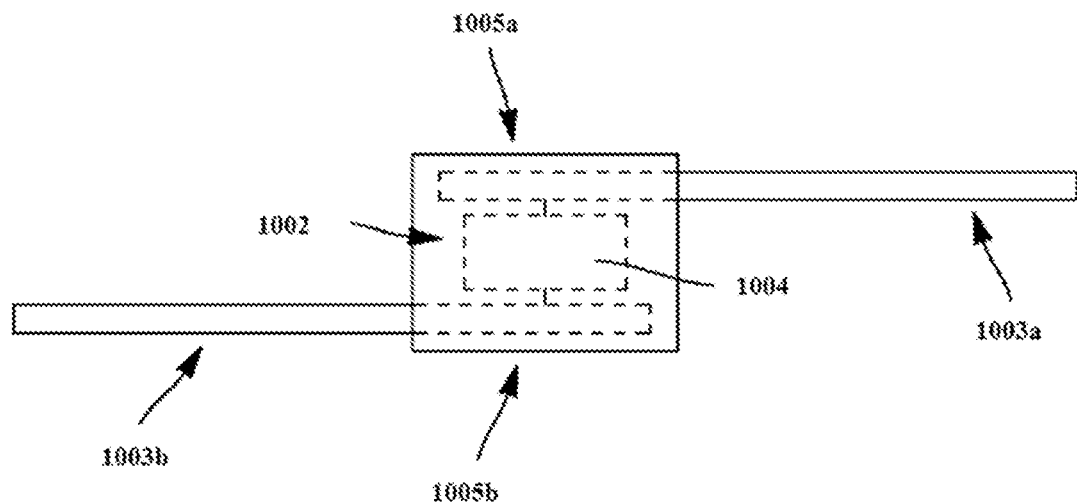
Fig. 1
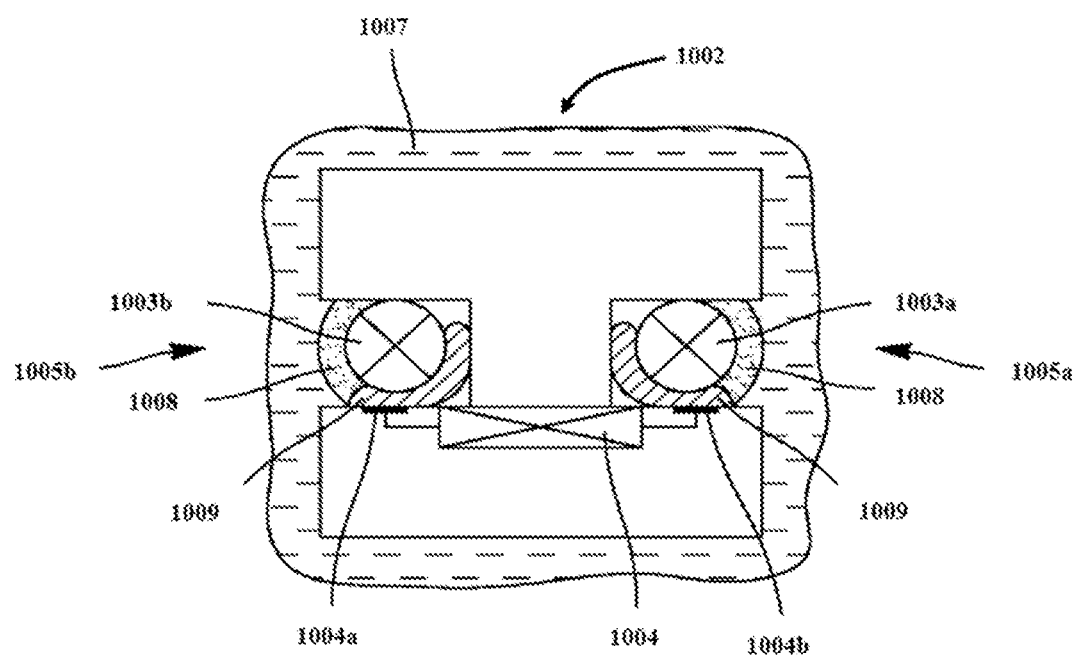
Fig. 1bis

TIRE COMPRISING A RADIOFREQUENCY TRANSPONDER

FIELD OF THE INVENTION

The present invention relates to a tyre casing equipped with an electronic radio identification device or radiofrequency transponder which is subjected, in particular in service when it is mounted on a land vehicle, to high thermomechanical stresses.

TECHNOLOGICAL BACKGROUND

For the field of RFID (acronym for Radio Frequency Identification) identification devices, passive radiofrequency transponders are conventionally used for the identification, tracking and management of objects. These devices enable more reliable and faster automated management.

These passive radiofrequency identification transponders generally consist of at least one electronic chip and an antenna formed by a magnetic loop or a radiating antenna which is fixed to the object to be identified.

The communications performance of the radiofrequency transponder is expressed in terms of the maximum distance of communication of the radiofrequency transponder with a radiofrequency reader, for a given signal communicated to or by the radiofrequency reader.

In the case of highly extensible products such as, for example, tyres, there is a need to identify the product throughout its life from its manufacture to its removal from the market and, in particular, during use thereof. Next, in order to facilitate this task, in particular under the conditions of use on a vehicle, a high communications performance is required, which is expressed in terms of the ability to interrogate the radiofrequency transponder at a large distance (several metres) from the product, via a radiofrequency reader. Lastly, it is desired for the manufacturing cost of such a device to be as competitive as possible.

A passive radiofrequency identification transponder formed of a wrapped wire on which is wound a conductive filamentary element connected to an electronic chip comprising a radiofrequency transmission-reception circuit is known from the prior art, in particular from document WO 2019175509A1. The advantage of such a transponder lies in the simplicity of its production, which makes it inexpensive, and the miniaturization of the end product.

However, such a passive radiofrequency transponder has weaknesses in its use when it is integrated into a tyre casing. Indeed, the diameter of the conductive filamentary element is small in order to allow connection to the electronic chip which can be of the e-Tread type. However, the stresses which a tyre casing is subjected in operation are severe, and this can jeopardize the physical integrity of such a transponder. In addition, it must also be ensured that the introduction of such a radiofrequency transponder into a tyre casing does not disturb the physical integrity of the latter. Finally, the rubbery nature of the tyre casing and the diversity of elastomer compounds influence the radiocommunications performance of such a transponder.

The present invention relates to a tyre casing equipped with a passive radiofrequency transponder as described in the state of the art, aimed at improving the performance compromise, and in particular the physical integrity of the tyre casing and that of the radiofrequency transponder during its use on a vehicle while preserving the radiocommunications performance of the radiofrequency transponder.

SUMMARY OF THE INVENTION

The invention relates to a tyre casing in the shape of a torus about a reference axis and equipped with a passive radiofrequency transponder. The tyre casing comprises:
- a crown block comprising a crown reinforcement having an axial end at each of its edges, and a tread, connected at each of its axial ends to a bead having an interior end situated axially and radially on the inside of the bead with respect to the reference axis, by a sidewall,
- a carcass reinforcement, comprising at least one carcass reinforcement layer formed of mutually parallel reinforcing elements, defining a reinforcement direction, and which are inserted between two skim layers of elastomeric compound,
- the at least one carcass reinforcement layer being anchored in each of the beads by being turned up around an annular bead wire to form a main part of the at least one carcass reinforcement layer, extending from one bead wire to the other and situated radially on the inside with respect to the crown block, and a turn-up of the at least one carcass reinforcement layer in each of the beads,
- a second layer of elastomer compound forming the exterior surface of the tyre casing in the region of the bead, said second layer of elastomer compound being intended to come into contact with the rim,
- a third layer of elastomer compound situated radially on the outside in contact with the second layer of elastomer compound forming the exterior surface of said sidewall.

The passive radiofrequency transponder comprising a main core defining a first longitudinal axis and being electrically insulating, a first primary cover filament wound in turns around the main core defining a winding diameter D and an electrical insulation device disposed radially on the outside of the first primary cover filament with respect to the first longitudinal axis.

The first primary cover filament comprising at least two conductive filamentary elements, the diameter of which is between 0.05 and 0.15 millimetres, galvanically connected to at least one electronic chip comprising a radiofrequency transmission-reception component.

The main core having a stiffness lower than the maximum stiffness of the first primary cover filament.

The tyre casing is characterized in that the electrical insulation device has a mean relative dielectric permittivity less than or equal to 10, preferably less than 5, over a thickness greater than or equal to one sixth of the winding diameter D of the first primary cover filament, in that the passive radiofrequency transponder, in its longitudinal direction, is located in line with at least two reinforcing elements of the main part of the at least one carcass reinforcement layer, in that the passive radiofrequency transponder is located axially on the outside of the inner end of the bead and radially between the radially outermost end of the bead wire and the axial end of the crown reinforcement, preferably on the inside of the tyre casing and in that the thickness of elastomer compound separating the outer cover filament of the passive radiofrequency transponder, located radially outermost with respect to the first longitudinal axis, and the reinforcement elements is greater than 0.5 millimetres, preferably greater than 1.0 millimeter.

Advantageously, the outer cover filament of the passive radiofrequency transponder is covered with an adhesion promoter promoting adhesion between the outer cover filament and the elastomeric compounds adjacent to the outer cover filament.

Here, the term "elastomer" is understood to mean all the elastomers including TPEs (acronym of ThermoPlastic Elastomers), such as for example diene polymers, i.e. polymers comprising diene units, silicones, polyurethanes and polyolefins.

Here, the term "conductive filamentary element" means that the element has a main dimension along its length relative to the other three-dimensional dimensions of the element, that is to say at least a factor of 10. In addition, this element is conductive, that is to say it conducts electrical charges along the main dimension. It may for example be a filament that is entirely metallic or covered on its external surface with a metallic material such as copper, zinc, brass, silver or gold. These conductive filamentary elements may be a single-filament component, just as they may equally be a multiple-filament component. It can contribute to implementing the functions of the chip, in particular supplying the chip with energy and/or forming a radiofrequency antenna.

Here, the term "chip" means any integrated electronic component implementing one or more functions including at least one radiofrequency transmission-reception system comprising a radiofrequency transmission-reception component and a radiofrequency antenna. A "chip" can thus form a sensor, have a data-processing capability, a memory.

Here, the term "passive radiofrequency transponder" means that the electronic system emits a signal in response to a signal received without its own energy input to emit this response, that is to say that the energy for emitting the response is provided by the interrogating signal to the electronic system.

The term "situated in line with two reinforcement elements" means that the orthogonal projection of the element, here the first cover filament wound on the main core, onto the plane defined by two parallel reinforcement elements of the main part of the at least one carcass reinforcement layer intersects these two reinforcing elements when the tyre casing is in the green tyre state.

The passive radiofrequency transponder is designed so that it operates in the far field via a radiating dipole antenna to promote communication distance. This radiating dipole antenna comprises the two conductive filamentary elements of the first primary cover filament. This radiating dipole antenna is in the form of a helix, which makes it possible to easily withstand the high thermomechanical stresses that are encountered within a tyre casing, in particular in service. This helical twisting is facilitated by the presence of the main core which serves as a guide for the helix. It is the volume occupied by the main core that is important for the helical twisting of the conductive filamentary elements. In addition, the flexibility of the main core makes it possible for the radiofrequency transponder not to be made too stiff, which limits the forces passing through the radiofrequency transponder. Indeed, the presence of the main core provides a new pathway for the forces passing through the radiofrequency transponder, in particular under severe loading, thereby limiting the forces passing through the conductive filamentary elements and in particular through the galvanic connections with the electronic chip. The choice of low stiffness, relative to that of the conductive filamentary elements, ensures that the forces generated by the deformation of the main core are limited compared to a core with high stiffness for the same amount of deformation of the main core. Thus, the amount of force passed on from the main core to the conductive filamentary elements is limited and these conductive filamentary elements are encouraged to deform, their helical twisting minimizing the stresses on account of the geometric shape. As a result, the synergy between the mechanical properties of the main core, the helical twisting of the conductive filamentary elements and the diameter thereof guarantees that the forces passing through the conductive filamentary elements and in particular at the level of the galvanic connections with the chip, are limited, thereby ensuring the endurance of the assembly in a highly stressed environment such as a tyre. Greater stiffness would have required the use of a larger diameter of filament for the conductive filamentary element and/or would have required opting for a material with a higher endurance limit. This increased endurance of the radiofrequency transponder allows it to be positioned in the most highly stressed areas of tyres, which is not permitted for conventional radiofrequency transponder designs where the radiofrequency antenna is galvanically connected to the chip. In addition, a smaller conductive filamentary element diameter, of between 50 and 150 micrometres, guarantees a better quality of the galvanic connection of the conductive filamentary element to the electronic chip, which further reinforces its endurance. And, it also guarantees that the resistance of the losses will be low in the conductive filamentary element, thus improving the radioelectric performance of the radiofrequency antenna. However, it is necessary for the conductive filamentary element to maintain a certain mechanical strength in order to withstand the thermomechanical stresses that it will experience in a highly stressed environment such as a tyre casing, without optimizing the breaking limit of the material of these filamentary elements, which are generally made of mild steel. This embodiment makes it possible to have a differentiating technical-economic-industrial solution for radiofrequency transponders with galvanic connection between the radiofrequency antenna and the electronic chip. Since the conduction of the electromagnetic signal takes place by skin effect, the reduction in the diameter of the conductive filamentary element, in the aforementioned range, slightly modifies the radioelectric performance of the dipole antenna thus constituted. The main core must be of closed, solid or hollow section and be electrically insulating in order to guide the formation of the spring and not to disturb the radiocommunications performance of the radiating dipole antenna. This assembly contributes to the physical integrity of the passive radiofrequency transponder within the tyre casing. Finally, since the chip is equipped with a radiofrequency transmission-reception circuit, the assembly constitutes a passive radiofrequency transponder.

Here, the term "extensible core" means that the core has a high elongation and elastic return capacity, exceeding 5%, typically exceeding 50% or 100% of its length at rest. It may for example be a core of natural or synthetic rubber such as polyurethane or elastane.

Generally, a dipole radiating antenna defining a first longitudinal axis is created with the aid of two conductive filamentary elements connected to the electronic chip and which extend away from the latter in two mutually opposite directions. Thus, a half-wave dipole antenna is produced which has the advantage of being an omnidirectional antenna in transmission and reception allowing it to be freed from constraints on the positioning of the radiating antenna within the tyre casing so as to optimize the field of radiofrequency communications. This makes the communications performance of the passive radiofrequency transponder robust. The first primary cover filament comprising these conductive filamentary elements is helically twisted around the primary core to maintain a rectilinear orientation of said half-wave dipole antenna. Next, the half-wave dipole radiating antenna and the chip are embedded within an electrical insulation device. This electrical insulation minimizes the electrical losses and therefore improves the communications performance of the radiofrequency transponder both in transmission and in reception. The quality of electrical insulation is evaluated through a characteristic, the relative dielectric permittivity of the medium formed by the electrical insulation device. This relative dielectric permittivity must be at least less than 10 in order to have radiocommunications performance, and preferably less than 5 in order to have an improved range from which the passive radiofrequency transponder can be read when this transponder is placed in the architecture of the tyre casing at the level of the sidewall or the bead. In addition, the first primary covering filament comprising the half-wave dipole radiating antenna needs to be covered to a thickness of about one-sixth of the winding diameter D of the helix. Below this threshold, the radiofrequency communications performance cannot be satisfactorily guaranteed for a passive radiofrequency transponder incorporated within the tyre casing.

And for the physical integrity of the radiofrequency transponder and/or that of the tyre casing, it is necessary to guarantee the presence of a sufficient quantity of elastomeric compound between the outer cover filament and the reinforcing elements of the tyre casing. Generally, these components are of a non-elastomeric nature, and contact between these components can cause one or the other or both components to break under cyclic stresses during the life cycle of the tyre casing. In instances in which the break occurs at the level of the cover filament of the transponder, such as for example the first primary cover filament, this may deteriorate the radiofrequency operation of the transponder. In the case of the deterioration of the reinforcement elements, for example at the level of the carcass reinforcement layer, this can generate a mechanical imbalance of the carcass reinforcement leading to an accelerated deterioration of the latter and therefore of the tyre casing. A thickness of 0.5 millimetres is the minimum necessary for the least stressed areas in which the radiofrequency transponder is installed in the tyre casing. A thickness of at least one millimeter between these components ensures improved physical integrity of the two components regardless of the installation of the passive radiofrequency transponder in the sidewall or the bead of the tyre casing.

The fact that the characteristic dimension of the passive radiofrequency transponder, which dimension is defined by the first longitudinal axis, is located in line with several reinforcement elements of the carcass reinforcement layer ensures controlled positioning of the passive radiofrequency transponder in the thickness direction of the tyre casing, in particular during the manufacture of the latter during the shaping and curing steps. Specifically, this configuration reduces the possible shifting of the half-wave dipole antenna within the various non-crosslinked layers, notably with respect to the carcass reinforcement layer, when the tyre casing is being built up in the "green" state. This therefore substantially improves the physical integrity of the passive radiofrequency transponder during its use inside the tyre casing. Since the main carcass reinforcement layer of the tyre casing is arranged from one bead wire to the other, this allows a large operational zone for the installation of the passive radiofrequency transponder in the tyre casing. Specifically, the quantity of elastomeric material surrounding the passive radiofrequency transponder is thus controlled, so that the length of the radiating dipole antenna can be tuned to the electrical environment of the radiating dipole antenna within the tyre casing reliably and robustly.

Finally, the radiofrequency transponder is situated in the bead and sidewall region of the tyre casing, notably between the bead wire and the crown reinforcement of the crown block, so as to facilitate communication between it and an external radiofrequency reader notably in operation on the vehicle. Specifically, because the metallic elements of the bodywork of the vehicle, such as the wing or the wheel, which are generally made of metal, interfere with the propagation of radioelectric waves to or from the passive radiofrequency transponder situated with the tyre casing, notably in the UHF frequency range, installing the passive radiofrequency transponder in the sidewall and bead region, radially on the outside of the bead wire of the tyre casing, makes it easier for the passive radiofrequency transponder to be interrogated and read by an external radiofrequency reader from a long distance in numerous positions of the external radiofrequency reader when the tyre casing is in service on the vehicle. The communication of the passive radiofrequency transponder is therefore robust and reliable. Although not essential for radiofrequency communication, the passive radiofrequency transponder is situated on the inside of the tyre casing. It is then incorporated into this casing during the manufacture of the tyre casing, thereby safeguarding the read-only data contained in the memory of the electronic chip of the passive radiofrequency transponder such as, for example, the tyre casing identifier. The alternative consists in fixing, using techniques known from the prior art, a patch of elastomeric compound containing said passive radiofrequency transponder on the external surfaces of the tyre casing such as for example on the inner liner layer or on the sidewall. This operation can take place at any time during the life of the tyre casing, which makes the tyre casing information contained in the memory of the electronic chip of the passive radiofrequency transponder less reliable.

Optionally for the physical integrity of the tyre, it is also advantageous to guarantee the cohesion between the components of the radiofrequency transponder that are not adherent to the elastomer compound located radially outermost with respect to the first longitudinal axis and the elastomer compounds adjacent to these components whether these be internal to the radiofrequency transponder or included in the architecture of the tyre casing. Generally, the cover filaments are metallic and/or textile and the main core is textile. The cover filaments potentially represent components that are non-adherent to the elastomeric compound. The electronic chip and its direct components are radially on the inside of at least the first primary cover filament and do not then enter these non-adherent components. This cohesion reduces the risk of crack initiation and propagation at the interface defined by these different media.

According to one specific embodiment, the tyre casing comprises a fourth layer of elastomer compound situated axially on the outside of the main part of at least one carcass reinforcement layer and axially on the inside of the second and/or third layers of elastomer compound.

Thus, this configuration of tyre casing provides a compromise in the performance of the bead and of the sidewall that are differentiating and the passive radiofrequency transponder can be inserted in contact with this fourth layer of elastomer compound. This fourth layer of elastomer compound may, for example, be a bead-wire filler rubber situated between the main part and the turn-up of the carcass reinforcement layer and radially on the outside of the bead wire. It may also be a bead and/or sidewall filler rubber between this bead-wire filling rubber and/or the turn-up of the carcass reinforcement layer and the second and/or third layers of elastomer compound of the tyre casing.

The passive radiofrequency transponder may therefore be in contact with this fourth layer of elastomer compound.

According to another specific embodiment, with the tyre casing comprising an airtight layer of elastomer material situated furthest towards the inside of the tyre casing, the tyre casing comprises a fifth layer of elastomer compound situated on the inside of the main part of the at least one carcass reinforcement layer.

The term "airtight" is understood here to mean highly impermeable to air allowing the pressurized tyre casing to be driven on for at least one month without loss of inflation pressure in the absence of any incident affecting the tyre casing and under the same conditions of use.

This configuration of tyre casing, with its fifth layer of elastomer compound, in particular allows running in extended mode thanks to the fifth layer of elastomer compound located at the level of the sidewall of the tyre casing. In the event of the tyre casing suffering a loss of inflation pressure, the fifth layer of elastomer compound allows the transmission of load between the bead and the crown block without causing the sidewall of the tyre casing to buckle.

The passive radiofrequency transponder may therefore be in contact with this fifth layer of elastomer compound.

According to one particular embodiment, the tyre casing comprises a reinforcing layer formed of reinforcing elements inserted between two layers of rubber.

These are special-purpose casings which, depending on the type of use or in-service stress loadings, require localized reinforcing layers. For example, in the bead, this reinforcing layer is able to prevent rubbing between the wheel and the tyre casing. This reinforcing layer may also be located in a certain region, particularly the axial ends of the crown block, to constrain the geometry of the crown block and of the tyre casing under severe thermomechanical stress loading. This reinforcing layer generally has at least one free end. The passive radiofrequency transponder may then be in contact with or close to the free end of this reinforcing layer made of elastomer compound. It is then necessary to separate the outer cover filaments of the passive radiofrequency transponder from these reinforcing elements by a thickness of elastomer compound of at least 0.5 millimetres, preferably at least 1 millimeter.

According to one particular embodiment, with the reinforcing elements of the at least one carcass reinforcement layer being metallic, the first longitudinal axis of the radiating antenna of the passive radiofrequency transponder forms an angle of at least 45 degrees, preferably of at least 60 degrees, with the direction of reinforcement of the at least one carcass reinforcement layer.

Specifically, since the carcass reinforcement of the tyre casing comprises a layer of metal reinforcing elements defining a direction of reinforcement, it is necessary to incline the first longitudinal axis of the radiating dipole antenna constituted by the at least two conductive filamentary elements by an angle of at least 45 degrees with respect to this direction of reinforcement. Preferably, this angle is at least 60 degrees and very preferably the first longitudinal axis of the radiating dipole antenna is perpendicular to the direction of reinforcement. This inclination is necessary in order to limit the radioelectric interference of the radiating dipole antenna which is generated by the shielding defined by the metal carcass reinforcement. The perpendicularity of the radiating dipole antenna with respect to the carcass reinforcement minimizes its disturbances. An angle of 45 degrees allows the radiating dipole antenna to operate sufficiently well for the passive radiofrequency transponder to be read from a distance of more than one metre away from a tyre casing mounted on a rim, while an angle of 30 degrees doubles the radioelectric interference from the radiating dipole antenna.

According to one specific embodiment, with the first primary cover filament comprising a non-stretch tertiary core, arranged collinearly with the at least two conductive filamentary elements and with the at least one electronic chip, and at least one tertiary cover filament wound in turns around the tertiary core, the at least two conductive filamentary elements and the at least one electronic chip, the tertiary core has a stiffness greater than the maximum stiffness of each conductive filamentary element.

This embodiment makes it possible to stiffen the first primary cover filament, thus facilitating its handling and in particular its twisting into a helix around the main core. In order to preserve the alignment of the conductive filamentary elements while they are being helically wound, they are first reinforced with a tertiary core that is stiffer than the conductive filamentary elements on which they are supported. Thus, during operations for handling the first primary cover filament, it is possible to apply stresses to this tertiary core instead of applying them only to the conductive wire elements. Thus, the forces passing through the conductive filamentary elements are thus reduced, making them, and the galvanic connection between these conductive filamentary elements and the electronic chip, stronger. This embodiment improves the physical integrity of the passive radiofrequency transponder. The tertiary core can be a two-dimensional or three-dimensional element.

Advantageously, with one of the conductive filamentary elements being galvanically connected to an end of a third conductive filamentary element, the other end of which is galvanically connected to the electronic chip in order to form a loop, the parts of the conductive filamentary elements forming the loop and the at least one electronic chip are electrically insulated.

The loop thus formed constitutes an impedance matching circuit situated between the electronic chip and the halfwave dipole antenna constituted by two strands. The first strand is defined by the conductive filamentary element which is directly connected to the electronic chip while the other antenna strand consists of the part of the other conductive filamentary element extending beyond the loop. The galvanic connection between part of one of the two conductive filamentary elements and the third conductive filamentary element may be produced by means of an electronic chip, making it possible to use for example e-Tread technology between the various conductive filamentary elements and the chip. The impedance matching depends both on the curvilinear length of the loop and on the diameter of the conductive filamentary elements forming the loop. This impedance matching makes it possible to optimize the radiofrequency performance of the radiofrequency transponder at the inherent communication frequency thereof while limiting energy losses. The electrical insulation of this impedance-matching circuit makes it possible to limit interference from the electrical environment external to the radiofrequency transponder. Thus, the impedance matching is satisfactory regardless of the position of the radiofrequency transponder within the architecture of the tyre. Moreover, this electrical insulation can be achieved by means of glob tops, by applying an epoxy resin to the components, thereby protecting them and their connections both mechanically and chemically.

Very advantageously, the electronic chip and the conductive filamentary elements delimiting the loop are encapsulated in an electrically insulating rigid mass.

This makes it possible to guarantee the geometry of the loop, which sets the electrical impedance of the electronic system made up of the electronic chip and the loop. In particular, the helical winding of the first primary cover filament does not deform the geometry of the assembly and guarantees the output impedance at the terminals of the half-wave dipole antenna.

According a specific embodiment, the electrical insulation device of the passive radiofrequency transponder comprises at least one secondary cover filament wound in turns around a secondary core, the main core and the first primary cover filament, the secondary core being collinear with the main core.

This is a clever way of forming the electrical insulation device through a wrapping process similar to that which could be used for the first part of the passive radiofrequency transponder in which the filament comprising the secondary core, the main core and the first primary cover filament is wrapped by the secondary cover filament. Of course, in this case, the materials of the secondary core and of the secondary cover filament are chosen from electrically insulating materials in order to respect the average dielectric permittivity level of the electrical insulation device. Similarly, the thickness of the electrical insulation device is defined by the dimensions of the secondary core, the diameter of the secondary cover filament and the winding in turns of the latter defined by the number of layers, the pitch between the turns. There is a thickness of the electrical insulation device from which stability of the electrical environment in which the passive radiofrequency transponder is located is guaranteed when the latter is incorporated into the architecture of a tyre casing. This threshold thickness is around 2 to 5 millimetres beyond the cylinder circumscribed on the first primary cover filament for passive radiofrequency transponders operating in the frequency band between 800 and 960 MHz. This threshold thickness makes it possible to make the subject matter of the invention robust in terms of radiofrequency performance by ensuring a constant environment for the radioelectric waves received or radiated by the passive radiofrequency transponder. This makes it possible to robustly fix the dimension of the half-wave radiating dipole antenna for operation at the target communication frequency. Of course, this thickness of electrical insulation around the passive radiofrequency transponder can also be obtained by other electrical insulation device structures such as, for example, a mass of electrically insulating elastomer compound having a dielectric permittivity of less than 10, preferably less than 5. The term "electrically insulating" is understood here to mean that the electrical conductivity of the elastomer compound is at least below the conductive charge percolation threshold of the compound. The collinearity of the main and secondary cores ensures a homogeneous distribution of the electrical insulation around the radiating dipole antenna. Ideally, the two cores are coaxial, which requires that the secondary core be of closed or quasi-closed hollow section to allow the insertion of the main core and the half-wave dipole antenna inside.

Generally, a textile, for example nylon, secondary cover filament or secondary core should be used, for example. In this case, the outer cover filament becomes the secondary cover filament which will have to be covered with an adhesion promoter compatible with the elastomer compounds adjacent to this secondary cover filament.

Advantageously, the stiffness of the secondary core is at most equal to the stiffness of the main core.

This also makes it possible not to stiffen the radiofrequency transponder. Thus, the thermomechanical stresses exerted on the radiofrequency transponder are distributed between the two cores, which makes it possible to reduce those passing through the main core. Thus, the physical integrity of the radiating dipole antenna and of the galvanic connections between the electronic chip and the conductive filamentary elements is improved, even when the radiofrequency transponder is fitted in a highly stressed area of the tyre casing.

According to a first preferred embodiment, the passive radiofrequency transponder is situated at an interface defined by a surface of a layer of elastomer compound of the tyre casing.

This is an embodiment which makes the passive radiofrequency transponder easier to fit in the architecture of the tyre casing. The fitting of the passive radiofrequency transponder takes place directly in the means for building the green tyre by said passive radiofrequency transponder being placed onto the external surface of a layer of elastomer compound. This layer of elastomer compound may also be a skim layer. The passive radiofrequency transponder will then be covered with a second layer of elastomer compound. In this way, the passive radiofrequency transponder is therefore fully encapsulated by the components of the tyre casing. It is therefore embedded within the tyre casing, ensuring that it cannot be falsified when the memory of the electronic chip is write-protected.

As a preference, with the interface being defined by another layer of elastomer compound or a reinforcement layer, the passive radiofrequency transponder is situated at a distance of at least 5 millimetres from the ends of the layers at the interface.

The passive radiofrequency transponder presents as a foreign body in the build of the tyre, constituting a mechanical singularity. The ends of the layers at the interface also constitute mechanical singularities. To safeguard the endurance of the tyre casing, it is preferable for the two singularities to be distanced from one another by a certain distance. The greater this distance, the better, the minimum distance of the influence of a singularity being of course proportional to the size of this singularity. The singularity formed by the end of a layer becomes more sensitive the greater the stiffness of the layer in comparison with the stiffness of the adjacent layers such as, for example, a reinforcing layer, whether this be a reinforcement reinforcing layer, a crown reinforcing layer or a carcass reinforcing layer. When the reinforcers are made of metal or of textile of high stiffness, such as in the case of aramid, for example, it is appropriate to keep the two singularities at least 10 millimetres apart.

According to a second preferred embodiment, the passive radiofrequency transponder is situated on the inside of a layer of elastomer compound of the tyre casing.

This second embodiment has the advantage of leaving the choice as to the exact position of the passive radiofrequency transponder depending on the thickness of the tyre casing, unlike in the first preferred embodiment which imposes the position by the interface between the layers of elastomer compound. It is thus also possible to encapsulate the passive radiofrequency transponder in a mass of elastomer compound that is uniform from an electrical insulation and stiffness viewpoint, facilitating good radiofrequency and mechanical operation of the passive radiofrequency transponder. This also allows the radiofrequency transponder to be prepared for incorporation into the layer of elastomer compound away from the means used for building the tyre casing, and this proves to be more productive. Thus, this second preferred embodiment offers a wider choice for the installation of the passive radiofrequency transponder within the tyre casing.

Advantageously, the first longitudinal axis of the radiating dipole antenna of the passive radiofrequency transponder is perpendicular to the thickness of the layer of elastomer compound.

The layers of elastomer compound are generally thick layers partially superposed on one another to build a tyre casing. In order to gain the best control over the positioning of the passive radiofrequency transponder within the tyre casing, it is preferable for the main dimension of the passive radiofrequency transponder, namely the first longitudinal axis, to be oriented perpendicular to the thickness of the layer of elastomer compound. This avoids the risk of the radiofrequency transponder, inclined with respect to the surface of the elastomer compound, passing through the external surface of the layer of elastomer compound during manufacture of the tyre and into another layer. Such an instance could potentially be harmful to the endurance of the tyre casing.

Highly advantageously, the passive radiofrequency transponder is situated at a distance of at least 0.3 millimetres from the surfaces of the layer of elastomer compound.

A "distance of at least 0.3 millimetres" is understood here to mean that any external material point of the first object, in this instance the passive radiofrequency transponder potentially equipped with its encapsulating mass, is situated at a distance left greater than or equal to 0.3 millimetres from any material point of the second object, in this instance the surfaces of the layer of elastomer compound. In particular, this distance of 0.3 millimetres should be measured in the cured state.

This then prevents the risk of any potential shifting of the passive radiofrequency transponder within the layer of elastomer compound under thermomechanical stresses, or any spread in the positioning of the passive radiofrequency transponder within the layer of elastomer compound during the phase of manufacturing the tyre casing. This positioning will not cause the passive radiofrequency transponder to leave the layer of elastomer compound. This then ensures controlled electrical and mechanical insulation of the passive radiofrequency transponder within the layer of elastomer compound, which in turn ensures the endurance of the tyre casing and of the radiofrequency transponder while at the same time guaranteeing good radiofrequency operation.

According to one specific embodiment, the radioelectric communication with the radiofrequency reader occurs in the UHF band and most specifically in the range comprised between 860 and 960 MHz.

Specifically, in this frequency band, the length of the radiating dipole antenna is inversely proportional to the communication frequency. Furthermore, outside of this frequency band, radioelectric communication is highly impaired, or even impossible, through standard elastomeric materials. Thus, this is the best compromise between the size of the radiofrequency transponder sized according to the length of the dipole antenna and its radioelectric communication, in particular in the far field, making it possible to have communication distances that are satisfactory for the tyre industry.

According to another particular embodiment, the length L of the helical winding of the first primary cover filament of the passive radiofrequency transponder along the first main axis is between 30 and 80 millimetres.

Specifically, in the frequency range between 860 and 960 MHz and depending on the relative dielectric permittivities of the elastomer compounds surrounding the radiofrequency transponder, the total length of the helical spring, which is tailored to the half-wavelength of the radioelectric waves transmitted or received by the radiofrequency transponder, is located in the interval between 30 and 80 millimetres, preferably between 35 and 70 millimetres. In order to optimize the operation of the radiating antenna at these wavelengths, the length of the half-wave dipole antenna should be perfectly tailored to the wavelength. The length of the electronic chip and possibly that of the loop used for impedance-matching of the assembly must also be taken into account.

Advantageously, the winding diameter D of the helical spring is between 0.6 and 2.0 millimetres, preferably between 0.6 and 1.6 millimetres.

This allows the volume taken up by the half-wave dipole antenna to be limited and therefore allows the thickness of the electrical insulation device around the radiofrequency transponder to be increased. Of course, this diameter of the helical spring may be constant, variable, continually variable or piecewise variable. It is preferable from the point of view of the mechanical integrity of the radiating antenna for the diameter to be constant or continuously variable.

According to one preferred embodiment, the helix pitch of the radiating antenna is between 1.0 and 4.0 millimetres and, preferably, between 1.0 and 2.0 millimetres.

This makes it possible to ensure that the ratio of the helix pitch to the winding diameter of the spring, or at least one loop, in the first region of the radiating antenna, is between 0.8 and 3, guaranteeing a minimum of elongation of the helical spring, while ensuring radioelectric performance is satisfactory as regards both transmission and reception. In addition, this pitch may also be constant or variable throughout the radiating antenna. Of course, it is preferable for the pitch to be continuously variable or variable with slight variations in transition in order to avoid singular points in the radiating antenna that would constitute mechanical weaknesses in the radiating antenna.

According to one advantageous embodiment, the diameter of the conductive filamentary elements is between 0.08 and 0.11 millimetres.

In this range, loss resistance is certain to be low, thus improving the radioelectric performance of the radiating antenna. Moreover, these diameter sizes allow the conductive filamentary element to be attached to an electronic chip using e-tread technology. However, it is necessary for the filament to retain a certain mechanical strength in order to be able to bear the thermomechanical stresses that it will undergo in a highly stressed environment such as a tyre casing, without optimizing the breaking stress of the material of these filaments, which is generally mild steel. This makes it possible to ensure the radiating antenna represents a satisfactory technical/economical compromise.

BRIEF DESCRIPTION OF THE DRAWINGS

The invention will be better understood by means of the following detailed description. These applications are given solely by way of example and with reference to the appended figures, throughout which the same reference numerals denote identical parts, and in which:

FIG. 1 shows a diagram of the electronic part of a radiofrequency transponder according to the invention;

FIG. 1*bis* shows a sectional view of the electronic part of the radiofrequency transponder of FIG. 1 at the level of the electronic chip;

DETAILED DESCRIPTION OF EMBODIMENTS

Below, the terms "tyre" and "pneumatic tyre" are employed equivalently and refer to any type of pneumatic or non-pneumatic tyre (inflated or non-inflated tyre).

In FIG. 1, a chip 1002 is connected to two conductive filamentary elements 1003*a* and 1003*b* which define the first longitudinal axis of the passive radiofrequency transponder. To this end, the chip 1002 comprises two grooves 1005*a* and 1005*b* into which are respectively inserted the conductive filamentary elements 1003*a* and 1003*b* which each extend from one side of the chip 1002 to form a half-wave dipole antenna. The chip 1002 also includes a radiofrequency transmission-reception component 1004.

FIG. 1*bis* shows a detailed sectional view of the electronic part of the passive radiofrequency transponder of FIG. 1. The chip 1002 includes a radiofrequency transmission-reception component 1004. The conductive filamentary elements 1003*a* and 1003*b* are connected to the radiofrequency transmission-reception component 1004 via connection terminals 1004*a* and 1004*b*, respectively, arranged in the grooves 1005*a* and 1005*b*, respectively. Galvanic connection can be encouraged by means of a soldered or brazed joint 1009. To make the galvanic connection robust at the grooves 1005*a* and 1005*b*, it is possible to deposit an adhesive 1008 in the grooves 1005*a* and 1005*b* and on the parts of the conductive filamentary elements 1003*a* and 1003*b* at these grooves 1005*a* and 1005*b*. It is also possible to encapsulate the chip 1002 with a protective material 1007, such as an epoxy-type resin for example, to protect this chip 1002 both mechanically and chemically.

Figure 2:
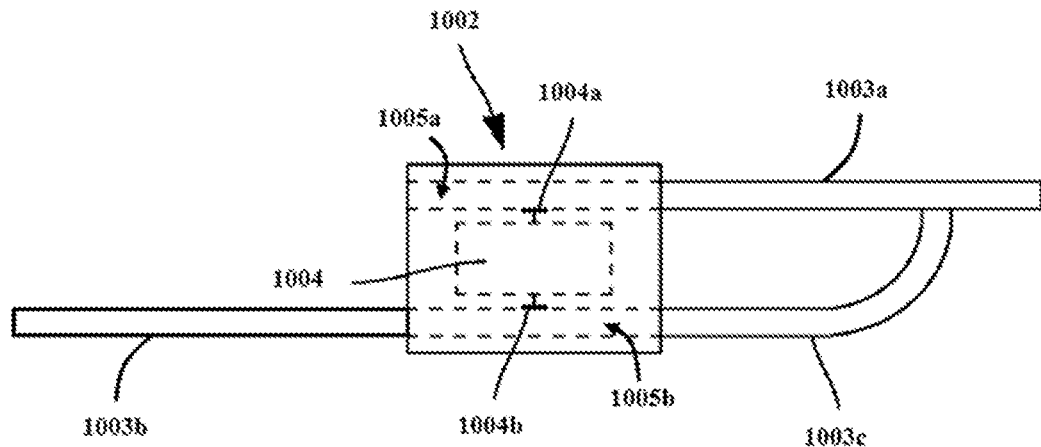
FIG. 2 is a diagram of the electronic part of the radiofrequency transponder according to the invention according to a second embodiment.

FIG. 2 shows the electronic part of a passive radiofrequency transponder according to the invention in a second optional embodiment in which the chip 1002 is connected to a closed loop in order to match the impedance of the half-wave dipole antenna formed by the conductive filamentary elements 1003*a* and 1003*b* to that of the electronic chip 1002. This loop is obtained by connecting to one another a portion of a conductive filamentary element, in this example the element 1003*a*, and a third conductive filamentary element 1003*c*. The other end of the third conductive filamentary element 1003*c* is connected to the chip 1002 at the groove 1005*a*. In fact, industrially, it is possible to use a single conductive filamentary element 1003*b* of larger dimension so that it has a sufficient length to constitute both an antenna strand a quarter wavelength in length and the filamentary element 1003*c*. In addition, it is also possible to use an electrical connection chip 1002*bis* (not shown) in order to galvanically connect the first end of the third filamentary element 1003*c* to the conductive filamentary element 1003*a*. In this context, the length of the second conductive filamentary element 1003*a* comprises, on the one hand, an antenna strand a quarter wavelength in length and part of the loop between the two chips 1002 and 1002*bis*. This clever technique makes the industrial manufacture of the electronic part of the passive radiofrequency transponder robust and productive. The closed loop in this case consisting of a part of the conductive filamentary element 1003*a* between the chips 1002 and 1002*bis*, the filamentary element 1003*c* and the second connection chip 1002*bis*, being adjusted to match the electrical impedance of the half-wave dipole antenna formed by the conductive filamentary element 1003*b* and the other part of the conductive filamentary element 1003*a* to that of the electronic chip 1002. The electronic chip 1002 and the closed loop are covered with an electrically insulating protective material such as an epoxy-type resin for example, making it possible to protect the loop mechanically and chemically while ensuring stability of the electrical environment of the system. This protection ensures stability of operation of the closed loop and may consist of the superposition of a resin providing mechanical and chemical protection and a second insulating resin such as DELO AD 465.

Figure 3:
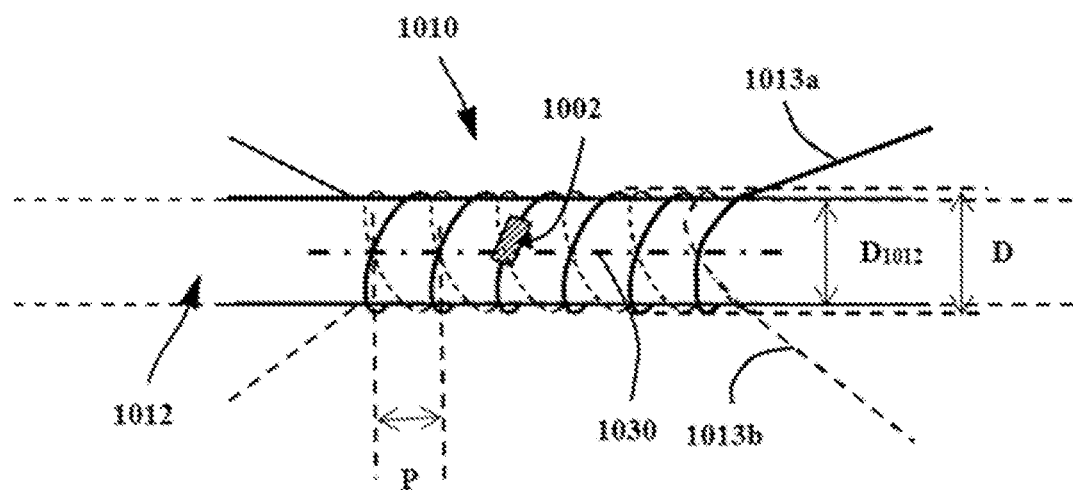
FIG. 3 is an example of the helical winding of the electronic part of the radiofrequency transponder according to the invention.

FIG. 3 shows the helical winding 1010 of the electronic part of the passive radiofrequency transponder according to a first embodiment. First of all, a main core 1012 is formed, and this may be an extensible filament made of natural or synthetic rubber such as polyurethane or elastane, or a non-extensible filament with a diameter $D_{1002}$ of less than 2 millimetres. In this example, it is a 940 HT polyacrylate filament which is nylon with a solid diameter of 0.5 millimetres. This main core 1012 is encircled by a first primary cover filament 1013*a* and, in this example, by a second primary cover filament 1013*b*. This primary cover filament 1013*a* comprises the electronic part of the passive radiofrequency transponder. This electronic part comprises at least the conductive filamentary elements 1003*a*, 1003*b*, and the electronic chip 1002. The conductive filamentary elements 1003*a* and 1003*b* are in this case metal, multi-filament or single-strand filaments with a diameter of less than 0.15 millimetres, preferably less than 0.11 millimetres. In this case it is a single-filament steel wire covered with a brass layer which allows the conduction of electrical charges on the surface and which can be soldered to the electronic chip 1002 by means of a braze in the case of the e-tread method. The winding of the first primary cover filament 1013a is carried out by wrapping the first primary cover filament 1013a around the main core 1012 making it possible to obtain a winding diameter D of the first primary cover filament 1013a of between 0.5 millimetres and 1.0 millimeter with a helix pitch varying from 0.8 to 3 millimetres. Thus, a half-wave dipole antenna is formed, the axis of the helix of which represents the first longitudinal axis 1030 of the passive radiofrequency transponder. Naturally, other methods of helically winding the primary cover filament 1013a may also be used to helically wind the electronic part of the passive radiofrequency transponder, such as twisting for example. A second primary cover filament 1013b is helically wound around the main core 1012 and the first primary cover filament 1013a. Its function is to make the assembly formed by the main core 1012 and the primary cover filament 1013a comprising the electronic part of the passive radiofrequency transponder mechanically integral. Thus, the geometry of the helical winding 1010 of the first primary cover filament 1013a is preserved. The winding of this second primary cover filament 1013b, which is generally a textile filament, is preferentially the opposite of that of the first primary cover filament 1013a, so as to balance the stresses, in particular torsional stresses, that they can generate in the system thus designed. The second primary cover filament 1013b is optional in our case since the conductive filamentary element 1013a is here made of steel which, due to its helical winding, will deform plastically. Thus, the geometry of the helical winding 1010 of the first primary cover filament 1013a is fixed by this plasticity of the material.

Figure 4:
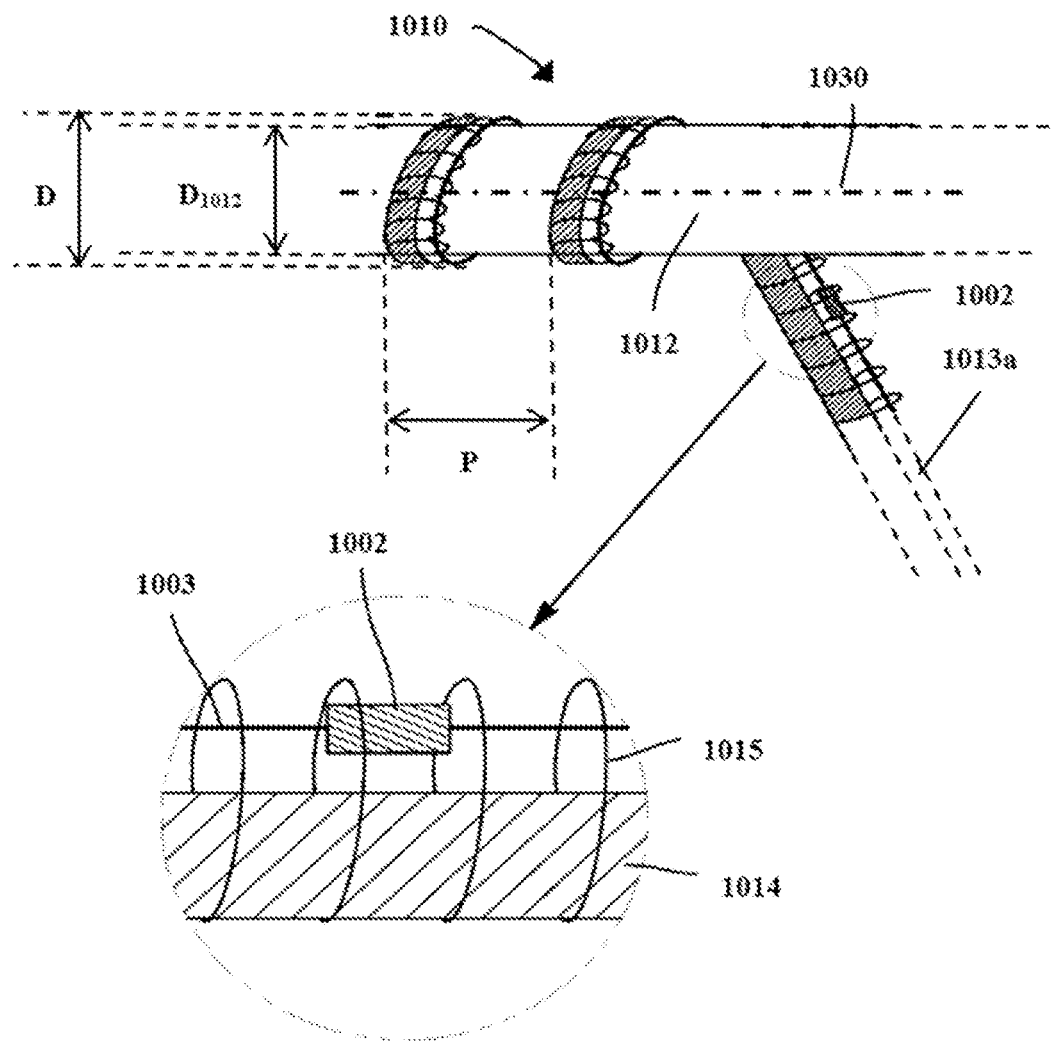
FIG. 4 is an example of helical winding according to another embodiment of the electronic part of the radiofrequency transponder according to the invention.

FIG. 4 shows helical winding 1010 of the electronic part of the passive radiofrequency transponder according to a preferred embodiment. This time, before the first primary cover filament 1013a is helically wound, it is reinforced by means of a tertiary core 1014. To be specific, during a step in preparation for helical winding, the electronic part of the passive radiofrequency transponder is combined with a tertiary core 1014 in order to reduce the thermomechanical stresses passing through the conductive filamentary elements 1003a and 1003b, in particular in the areas where they are connected to the electronic chip 1002. To this end, the electronic part is arranged collinearly with a tertiary core 1014 to which it is integral. This integral connection is in this case produced by means of a textile tertiary cover filament 1015 helically wound around the tertiary core 1014 and the electronic part of the passive radiofrequency transponder. Naturally, it is possible to balance out the stresses of this primary cover filament 1013a by means of a second tertiary cover filament wound in the opposite direction to the first tertiary cover filament 1015. Moreover, this double winding guarantees better cohesion between the tertiary core 1014 and the electronic part of the radiofrequency transponder. The presence of this tertiary core 1014 ensures a reduction in the stresses passing through the conductive filamentary elements 1003a and 1003b of the electronic part by multiplying the paths that the forces can take. It also makes handling of the primary cover filament 1013a robust, in particular handling by automatons, which improves the productivity of the helical winding of the electronic part of the passive radiofrequency transponder. Necessarily, the tertiary core 1014 is electrically insulating so as not to impair the operation of the electronic part of the passive radiofrequency transponder. It is preferable that the tertiary core 1014 be inextensible and stiffer than the conductive filamentary elements 1003a and 1003b in order to reduce the deformations and stresses in the conductive filamentary elements 1003a and 1003b and guarantee geometric stability for the helical winding 1010 of the electronic part of the passive radiofrequency transponder.

The helical winding of the electronic part of the passive radiofrequency transponder defines a first longitudinal axis 1030, a winding diameter D which is necessarily greater than or equal to the diameter of the circumscribed circle of the main core 1012 and a helix pitch P. Adjustment of these last two parameters of the helical winding makes it possible both to guarantee a deformation capacity of the helix 1010 minimizing the forces passing through the primary cover filament 1013a and to match the impedance of the half-wave dipole antenna formed by the conductive filamentary elements 1003 to that of the electronic chip 1002, which makes it possible to optimize the radiofrequency communication of the passive radiofrequency transponder.

Figure 5:
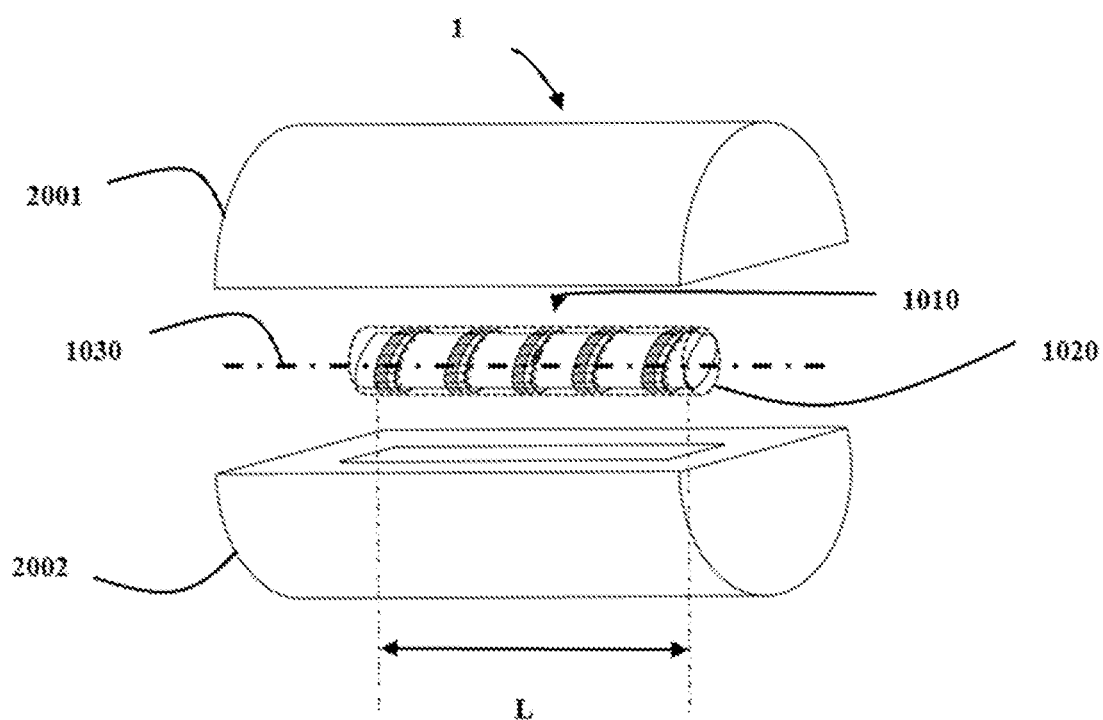
FIG. 5 is an exploded view of a passive radiofrequency transponder in a first embodiment of the electrical insulation device according to the invention.

FIG. 5 is an exploded perspective view of a passive radiofrequency transponder 1 according to a first embodiment. This radiofrequency transponder 1 is in the form of a first sub-assembly 1010 wrapped in an electrical insulation device. The sub-assembly 1010, corresponding to the helical winding of the electronic part of the passive radiofrequency transponder 1, is in this case formed by a first primary cover filament helically wound around a main core. The first primary cover filament comprises the conductive filamentary elements, two of which form the half-wave dipole antenna, and at least one electronic chip connected to its terminals by the conductive filamentary elements. In this example, a closed loop is created by means of a third conductive filamentary element and a connection chip according to the principle presented in FIG. 2. The length L of the helical winding 1010 of the first primary cover filament, corresponding to the electronic part, of the passive radiofrequency transponder 1 is around 60 millimetres, between 30 and 80 millimetres. The helix is formed around a main core with an outside diameter of 0.5 millimetres, with a helix pitch of around 1 millimeter. This helix geometry makes it possible to match the impedance of the half-wave dipole antenna to that of the electronic chip equipped with its closed loop. The sub-assembly 1010 is positioned in the centre of the electrical insulation device owing to the dielectric homogeneity of the electrical insulation device. In this example, the helical winding 1010 of the electronic part of the passive radiofrequency transponder 1 is covered with an adhesion promoter 1020. This adhesion promoter 1020 guarantees better cohesion between the outer cover filament of the helical winding 1010 of the electronic part of the passive radiofrequency transponder 1, which here is a first primary cover filament, and the elastomer compounds adjacent to this outer cover filament.

The electrical insulation device here consists of two masses 2001 and 2002 in an elastomer compound, the relative dielectric permittivity of which is less than 5. The thickness of the electrical insulation device radially outside the outer cover filament with respect to the main longitudinal axis 1030 is 3 millimetres, well above one-sixth of the winding diameter, here around 1 to 2 millimetres, of the helical winding of the electronic part of the passive radiofrequency transponder 1. This ensures a region of electrical insulation around the half-wave dipole antenna which is sufficient for good radiofrequency communication efficiency.

Figure 6:
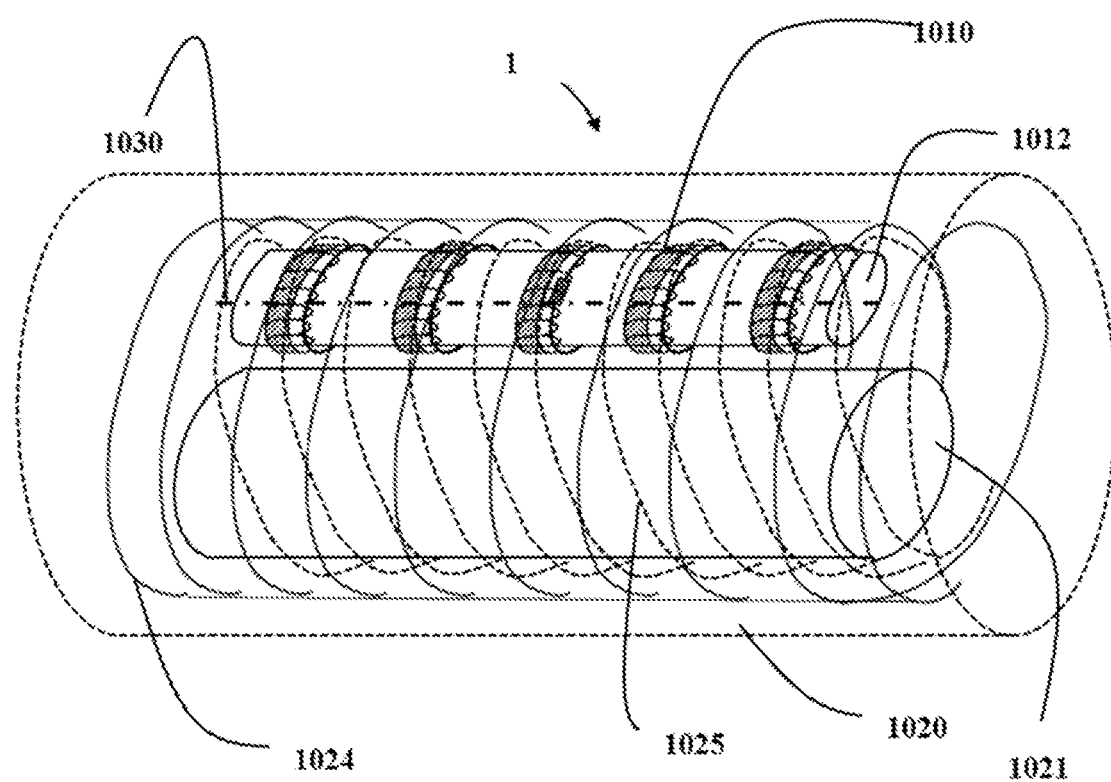
FIG. 6 is a perspective view of a passive radiofrequency transponder in a second embodiment of the electrical insulation device according to the invention.

FIG. 6 is a partially schematic perspective view of the passive radiofrequency transponder 1 according to another embodiment in which the electrical insulation device consists of textile secondary cover filaments 1024 and 1025.

The passive radiofrequency transponder 1 here consists of a helical winding 1010 of the electronic part around a main core 1012 defining a first longitudinal axis 1030. This helical winding 1010 is produced by a single primary cover filament comprising a tertiary core arranged collinearly with respect to the two conductive filamentary elements defining the half-wave dipole antenna, one end of which is connected to an electronic chip. The electrical insulation device here consists of a secondary core 2021 arranged collinearly with the helical winding 1010 of the electronic part of the passive radiofrequency transponder 1. This secondary core 2021 is, in this instance, solid and electrically insulating with a relative dielectric permittivity of less than 10; it consists of a multi-filament polyacrylate yarn. In another variant, the secondary core 1002 could be hollow in order to make it possible to receive inside its tubular orifice the helical winding 1010 of the electronic part. Here, it is arranged parallel to the main longitudinal axis 1010. This therefore requires the presence of a secondary cover filament helically wound around the sub-assembly 1010 and the secondary core 1021 which will make the two components integral with one another, thus guaranteeing the rectilinear geometry of the helical winding 1010 of the electronic part. This first secondary cover filament 1024 is shown schematically by the solid line representing its neutral axis. In order to balance the stresses, a second secondary cover filament 1025 is wound around the two components in the opposite direction. Duplicating the secondary cover filaments guarantees better cohesion of the assembly. It also ensures a certain homogeneous thickness of electrical insulation around the electronic part of the radiofrequency transponder 1, much greater than one-sixth of the winding diameter D of the helical winding 1010 of the electronic part. In fact, a thickness of 3 to 4 millimetres of electrical insulation constitutes the threshold thickness beyond which increasing the thickness no longer affords any gain in radioelectric performance of the passive radiofrequency transponder. This threshold thickness may be obtained by a single large-diameter secondary cover filament, a multitude of winding turns of the one and the same smaller-diameter filament or a combination of several secondary cover filaments of intermediate diameter, as in this case.

Lastly, with the secondary cover filaments 1024 and 1025 being generally made of textile, such as for example polyacrylate, and being arranged radially outermost with respect to the main longitudinal axis 1030, they constitute the outer cover filaments especially if these filaments are not touching. They should thus be covered with an adhesion promoter 1020 in order to guarantee cohesion between the outer cover filaments and the elastomer compounds adjacent to these outer cover filaments. In this case, the adjacent elastomer compounds are layers of the tyre casing.

The circumferential direction of the tyre, or longitudinal direction, is the direction that corresponds to the periphery of the tyre and is defined by the direction of running of the tyre casing.

The transverse or axial direction of the tyre is parallel to the axis of rotation, or reference axis, of the tyre casing.

The radial direction is a direction which crosses the axis of revolution, or reference axis, of the tyre casing and is perpendicular thereto.

The axis of rotation of the tyre casing is the axis about which it turns in normal use.

A radial or meridian plane is a plane that contains the axis of rotation of the tyre.

The circumferential median plane, or equatorial plane, is a plane that is perpendicular to the reference axis of the tyre casing and that divides the latter into two halves.

Figure 7:
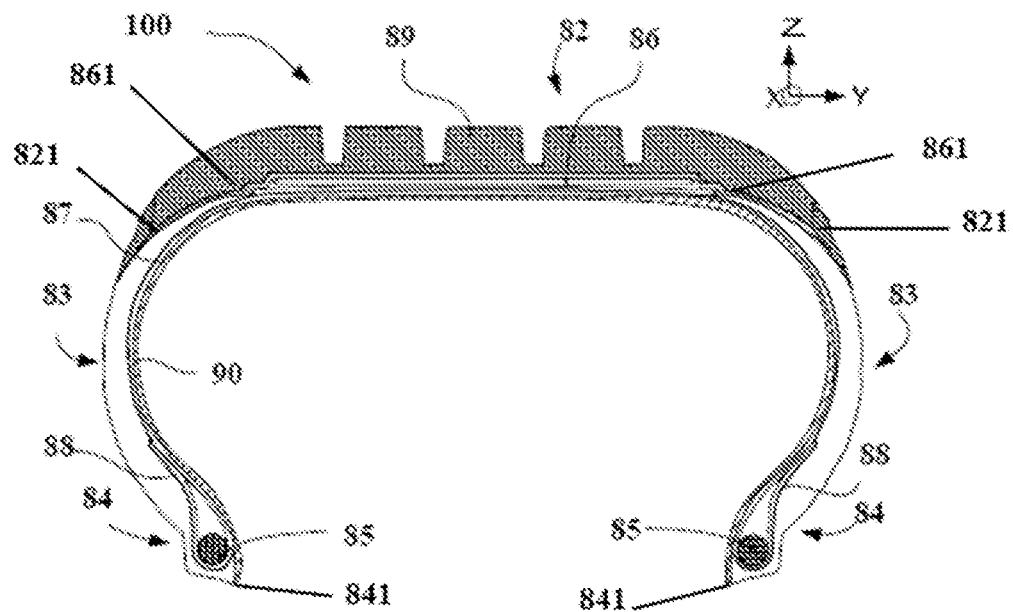
FIG. 7 is a view in meridian section of a tyre casing of the prior art.

FIG. 7 shows a meridian section of a tyre casing 100 including a crown 82 reinforced by a crown reinforcement or belt 86, two sidewalls 83 and two beads 84. The crown 82 is delimited axially by two axial ends 821 providing the connection with each sidewall 83 of the tyre casing 100. The crown reinforcement 86 extends axially as far as an axial end 861 at each of its edges. The crown reinforcement 86 is surmounted radially on the outside by a tread 89 made of an elastomeric material. Each bead 84 is reinforced with a bead wire 85. A carcass reinforcement 87 anchored in the beads 84 separates the tyre casing into two regions, which will be called inner region in the direction of the fluid cavity and outer region towards the outside of the tyre. The carcass reinforcement comprises a main part 87 which is wound around the two bead wires 85 in each bead 84. The turn-up 88 of this main part 87 of the carcass reinforcement is arranged here towards the outside of the tyre casing 100. The carcass reinforcement is, in a way known per se, made up of at least one layer reinforced with cords, for example in this instance textile cords, which is to say that these cords are arranged practically parallel to one another. The main part 87 extends from one bead 84 to the other so as to form an angle of between 80° and 90° with the circumferential median plane EP. An airtight inner liner 90 extends from one bead 84 to the other radially internally with respect to the main part of the carcass reinforcement 87.

Figure 8:
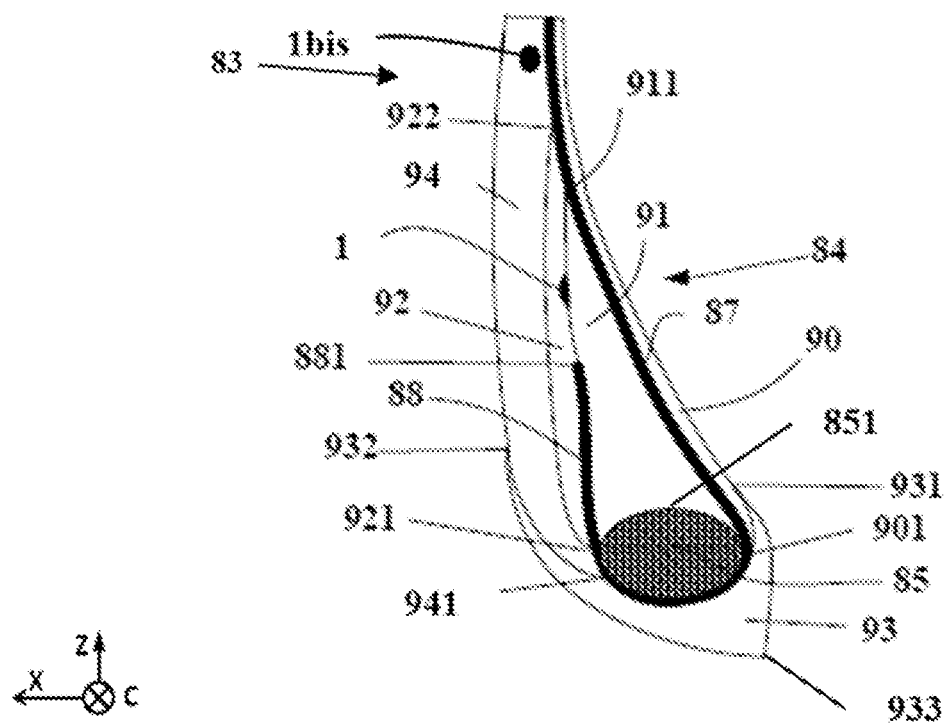
FIG. 8 is a view in meridian section of the bead and the sidewall of a tyre casing according to the invention when the passive radiofrequency transponder is located at the level of the outer region of the tyre casing.

FIG. 8 shows a detailed view of the tyre casing 100 in the region of the bead 84 and the sidewall 83. This figure illustrates the positioning of the passive radiofrequency transponder 1 in the exterior region of the tyre casing 100 with respect to the main part of the carcass reinforcement which, in the instance depicted, is made up of a single carcass layer 87.

The bead 84 consists of the bead wire 85, around which the main part of the carcass layer 87 is wound, with a turn-up portion 88 situated in the outer region of the tyre casing 100. The turn-up 88 of the carcass layer ends with a free edge 881. A fourth layer of rubber compound 91, called bead wire filler, is situated radially externally and adjacent to the bead wire 85. It has a radially outer free edge 911 bearing on a face of the main part of the carcass layer 87 (more precisely on the outer skim of the carcass layer; there is no direct contact between the cords of the carcass layer and the electronic unit). A second fourth layer of rubber compound 92, called "reinforcing filler", is adjacent thereto. It has two free edges. The first free edge 921 is situated radially internally and bears on the turn-up portion 88 of the carcass layer. The other free edge 922 is situated radially externally and ends on the face of the main part of the carcass layer 87. Finally, the sidewall 83 is defined by means of a third layer of elastomer compound 94 covering both the second fourth layer of elastomer compound 92 and the main part of the carcass layer 87. The sidewall defined by the external surface of the third layer of elastomer compound 94 which has a free edge 941 situated radially on the inside and ends on the turn-up portion of the carcass layer.

The airtight inner liner 90, which is adjacent to the main part of the carcass layer 87 in this configuration, is located on the inner region of the tyre casing 100. It ends with a free edge 901 adjacent to the main part of the carcass layer 87. Finally, a second layer of elastomer compound 93, referred to as the bead protector, protects the carcass layer and the radially interior ends 901, 921 and 941 of the inner liner 90, of the second fourth layer of elastomer compound 92 and of the third layer of elastomer compound 94 respectively. The outer face of this second layer of elastomer compound 93 is able to be in direct contact with the rim flange during mounting of the tyre casing 100 on the wheel. This second layer of elastomer compound 93 has three free ends forming a corner. The first free end 931 is situated in the inner region of the tyre casing 100. The second free end 932 is situated in the outer region of the tyre casing 100. Finally, the third free end 933 constitutes the interior end 841 of the bead 84.

A bead 84 and its connected sidewall 83 of this tyre casing 100 is equipped with passive radiofrequency transponders, numbered 1, possibly with suffixes, which are situated in the exterior region of the tyre casing 100. The first passive radiofrequency transponder 1 is positioned on the outer face of the fourth layer of elastomer compound or bead-wire filler 91. It is positioned at a distance of 10 millimetres from the free edge 881 of the turn-up portion 88 of the carcass layer that constitutes a mechanical singularity. This position ensures a region of mechanical stability for the radiofrequency transponder 1 that is beneficial to the mechanical endurance thereof. In addition, embedding it within the very structure of the tyre casing 100 gives it good protection against mechanical attacks coming from outside the tyre casing 100.

In general, it is preferable for the passive radiofrequency transponder to be positioned at a radial distance of between 20 to 40 millimetres from the radially outer end of the bead wire 85 in order to be in a region of the tyre casing that is mechanically stable during operation, as this ensures the physical integrity of the radiofrequency transponder. In addition, this positioning is guaranteed to be radially on the outside of the bead flange, allowing good radiocommunications performance by limiting the disturbances associated with the, often metallic, nature of the wheel.

The second radiofrequency transponder 1bis is positioned inside the third layer of elastomeric compound 94. The material similarity between the third layer of elastomeric compound 94 and the elastomeric compound defining the electrical insulation device of the passive radiofrequency transponder, or the presence of an adhesion promoter on the outer surface of the radiofrequency transponder, ensures placement of the radiofrequency transponder 1bis within the sidewall 83 during the curing process. The radiofrequency transponder 1bis is simply placed within the material via a slit in the still raw exterior face of the third layer of elastomer compound 94 during the building of the tyre casing 100. Pressurizing the green tyre body in the curing mould ensures that the radiofrequency transponder 1bis is, in the cured state, positioned as shown. This radiofrequency transponder 1bis is situated far from any free edge of any other constituent of the tyre casing 100 practically at the equator of the sidewall 83, providing the greatest radiofrequency communication distance. In particular, it is spaced apart from the free edge 932 of the bead protector, from the free edge 881 of the carcass layer turn-up 88 and from the free edges 911 and 922 of the filler rubbers. Its positioning ensures improved communications performance with an external radiofrequency reader, and especially with the specific shape for the radiating dipole antenna of the passive radiofrequency transponder. Cyclic stress loadings during running will not be disruptive owing to the helical winding and to the miniaturization of the electronic part of the passive radiofrequency transponder 1bis. Out of necessity, these two transponders are situated axially on the outside of the end 933 of the second layer of rubber compound 93 and therefore of the radially inner end of the bead 84. They are positioned radially between the radially outer end 851 of the bead wire 85 with respect to the reference axis of the tyre casing 100, and the axial ends 861 of the crown reinforcement 86. The orientation of the passive radiofrequency transponder is circumferential in this instance, although the only stipulation is that first longitudinal axis of the radiofrequency transponder must rest on at least two reinforcing elements of the main part of the carcass reinforcing layer 87.

Figure 9:
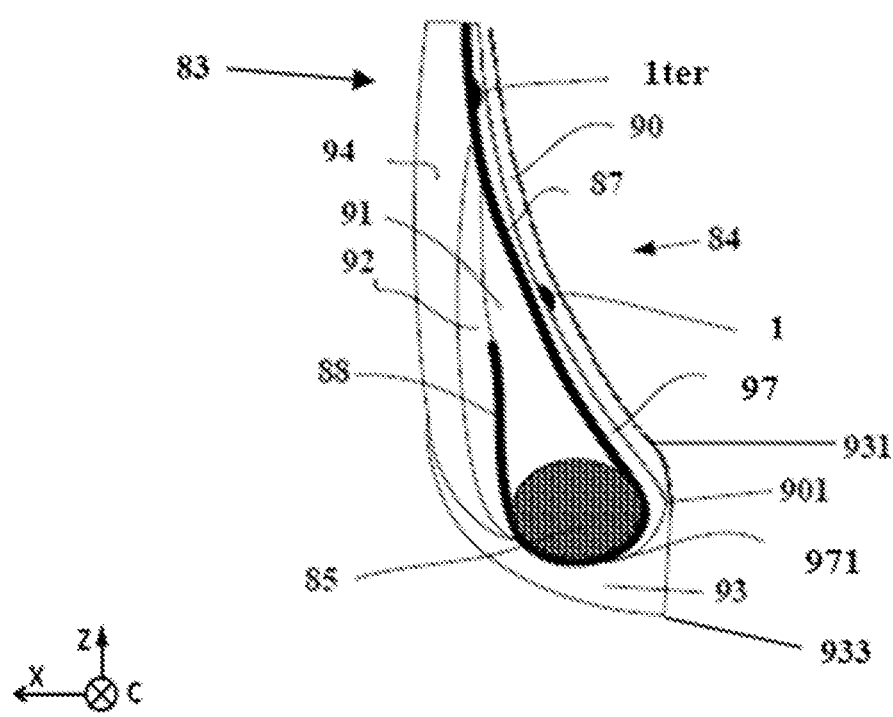
FIG. 9 is a view in meridian section of the bead and the sidewall of a tyre casing according to the invention when the passive radiofrequency transponder is located at the level of the interior region of the tyre casing.

FIG. 9 shows a detailed meridian section of a tyre casing 100 at the level of the bead 84 and of the sidewall 83. This FIG. 9 illustrates the position of the passive radiofrequency transponder in the inner region of the tyre casing 100 with respect to the main part of the carcass reinforcement 87.

The tyre casing 100 comprises, in particular at the inner region, an airtight inner liner 90 and a reinforcement reinforcing layer 97 interposed between the main part of the carcass layer 87 and the airtight inner liner 90. This component 97 has a radially interior free edge 971 located radially on the inside of the bead wire 85. This layer of reinforcers 97 extends from one bead 84 to the other bead 84 of the tyre casing 100.

The location of the radiofrequency transponder 1 at the interface between the airtight inner liner 90 and the layer of reinforcers 97 allows the radiofrequency transponder 1 to be mechanically stabilized. It is approximately 40 millimetres radially on the outside of the free edge 931 of the bead protector 93, which means it can be situated radially on the outside of the bead flange when the tyre casing mounted on a wheel is in operation. From a mechanical endurance point of view, this location is ideal for the passive radiofrequency transponder 1, which is protected from any external mechanical attack and from any internal thermomechanical attack. It can have any orientation provided that the passive radiofrequency transponder 1 along the first longitudinal axis rests on at least two reinforcement elements of the carcass reinforcement layer 87 and, with the component 97 being a reinforcement reinforcing layer, on several reinforcing elements of the layer of reinforcements 97. This ensures the radiofrequency transponder 1 an axial position, with respect to the thickness of the tyre casing 100, that allows robust tuning of the resonance of the radiating antenna of the passive radiofrequency transponder 1 when this transponder is incorporated in the tyre casing 100. In addition, a distance of at least 0.5 millimetres must be maintained between the outer cover filament of the passive radiofrequency transponder 1 and the reinforcing elements of the carcass reinforcement layer 87 or of the reinforcement reinforcing layer 97 in order to preserve the physical integrity of the radiofrequency transponder cover filaments and/or the reinforcing elements of the reinforcing layers. To this end, it is preferable to use a passive radiofrequency transponder 1 according to the embodiment of the electrical insulation device of FIG. 5.

The second location of the radiofrequency transponder 1ter according to the invention allows improved radiocommunications performance by being radially further outwards in the tyre casing 100. However, it is advisable for the first longitudinal axis, that is to say the radiating antenna, to be positioned in such a way that the radiofrequency transponder 1ter rests on at least two reinforcing elements of the carcass layer 87. Here, in this example, the first longitudinal axis is placed circumferentially. It is preferable for the passive radiofrequency transponder 1ter to be positioned at the interface defined by at least two components of the tyre casing 100. That means that the data contained in the electronic chip of the passive radiofrequency transponder cannot be falsified when this chip has been write-protected after the first writing to the memory associated with the electronic chip. Finally, the outer cover filaments of the passive radiofrequency transponder 1 must be spaced away from the reinforcing elements of the layers of the tyre casing by at least 0.5 millimetres.

Figure 10:
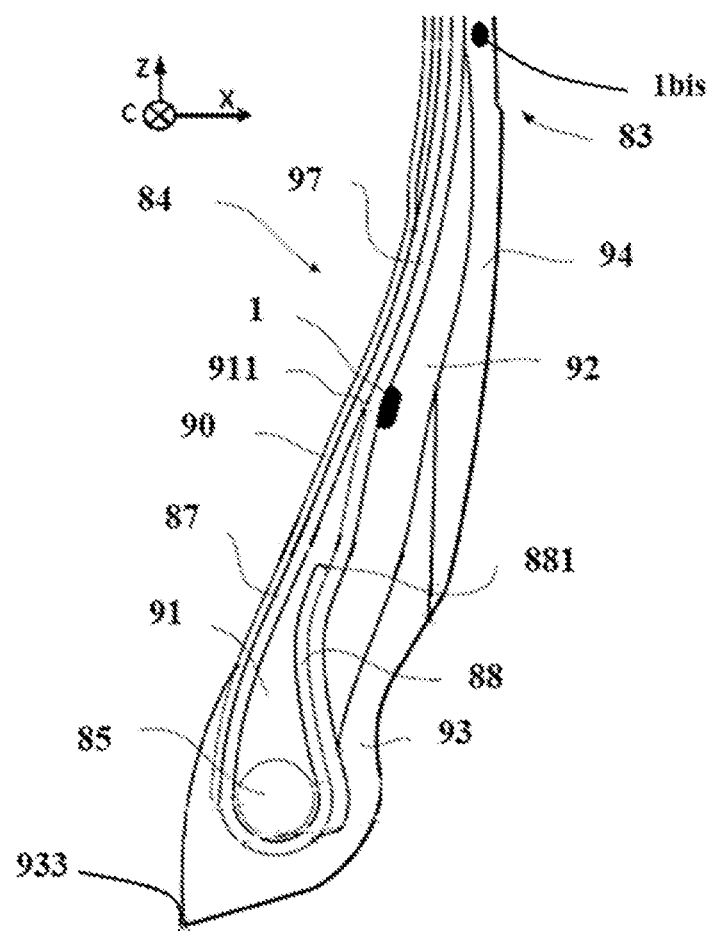
FIG. 10 is a view in meridian section of a tyre casing comprising two layers of carcass reinforcement.

FIG. 10 shows a meridian section through a tyre casing 100. This tyre casing 100 usually comprises a crown, two sidewalls 83 and two beads 84. Only the radially inner part of a sidewall 83 and a bead 84 are depicted in FIG. 10. The bead 84 depicted in FIG. 10 comprises a bead wire 85 exhibiting symmetry of revolution, a main part of a first carcass layer 87 extending from the sidewall 83 towards the bead wire 85 extended by a turn-up 88 wound around the bead wire 85 and extending radially on the outside as far as an end 881. This turn-up 88 is positioned axially towards the outside of the bead 84 of the tyre casing 100. A fourth layer of elastomer compound 91, known as the filling rubber, is positioned radially on the outside relative to the bead wire 85 and axially between the main part 87 and the turn-up 88 of the first carcass layer. This filling rubber 91 extends radially on the outside as far as an end 911. It should be noted that the end 911 of the filling rubber is situated radially on the outside relative to the end 881 of the turn-up 88.

The bead 84 also comprises a second carcass layer or reinforcing layer 97 extending in the figure from the sidewall 83 as far as the bead wire 85. This second carcass layer 97 is positioned axially on the outside relative to the main part of the first carcass layer 87, to the filling rubber 91 and to the turn-up 88 of the first carcass layer. The two carcass layers (87, 97) are, as is known per se, made up of plies reinforced by what are known as "radial" cords, for example here of textile, that is to say that these cords are disposed virtually parallel to one another and extend from one bead to the other so as to form an angle of between 80° and 90° with the median circumferential plane EP of the tyre casing. An airtight inner liner 90, situated on the inside of the tyre casing, extends from one bead 84 to the other radially internally with respect to the main part of the first carcass layer 87. The bead 34 comprises a second layer of elastomer compound or cushion gum (or "protector") 93 able to make contact with the surface of a rim. This cushion gum 93 extends radially on the outside as far as an interface with a third layer of elastomer compound 94 of which the external surface defines the sidewall 83. The cushion gum 93 and the sidewall rubber 94 constitute the exterior layer of the tyre casing. The bead 84 also comprises a second fourth layer of elastomer compound or additional filling rubber 92 arranged axially between, on the one hand, the second carcass layer 97 and, on the other hand, the cushion gum 93 and the sidewall rubber 94.

The bead 84 also comprises a passive radiofrequency transponder 1 positioned axially at the interface between the second carcass layer 97 and the additional filling rubber 92 and radially between the end 911 of the filling rubber 91 and the end 881 of the turn-up 88 of the first carcass layer 87. Here, the radiofrequency transponder 1 is positioned radially on the outside with respect to the radially outer end of the bead wire 85 at a distance of 40 millimetres. Furthermore, the outer cover filaments of the passive radiofrequency transponder 1 must be spaced away from the reinforcing elements of the layers of the tyre casing by at least 0.5 millimetres.

FIG. 10 also shows the positioning of a second passive radiofrequency transponder 1bis on the inside of the third layer of elastomer compound 94 situated near the equator of the tyre casing. This second position makes it possible to improve the communications performance of a radiofrequency transponder in operation on a vehicle because this position keeps the passive radiofrequency transponder away from the electrically conducting elements of the vehicle (wheel, wheel arch).

Figure 11:
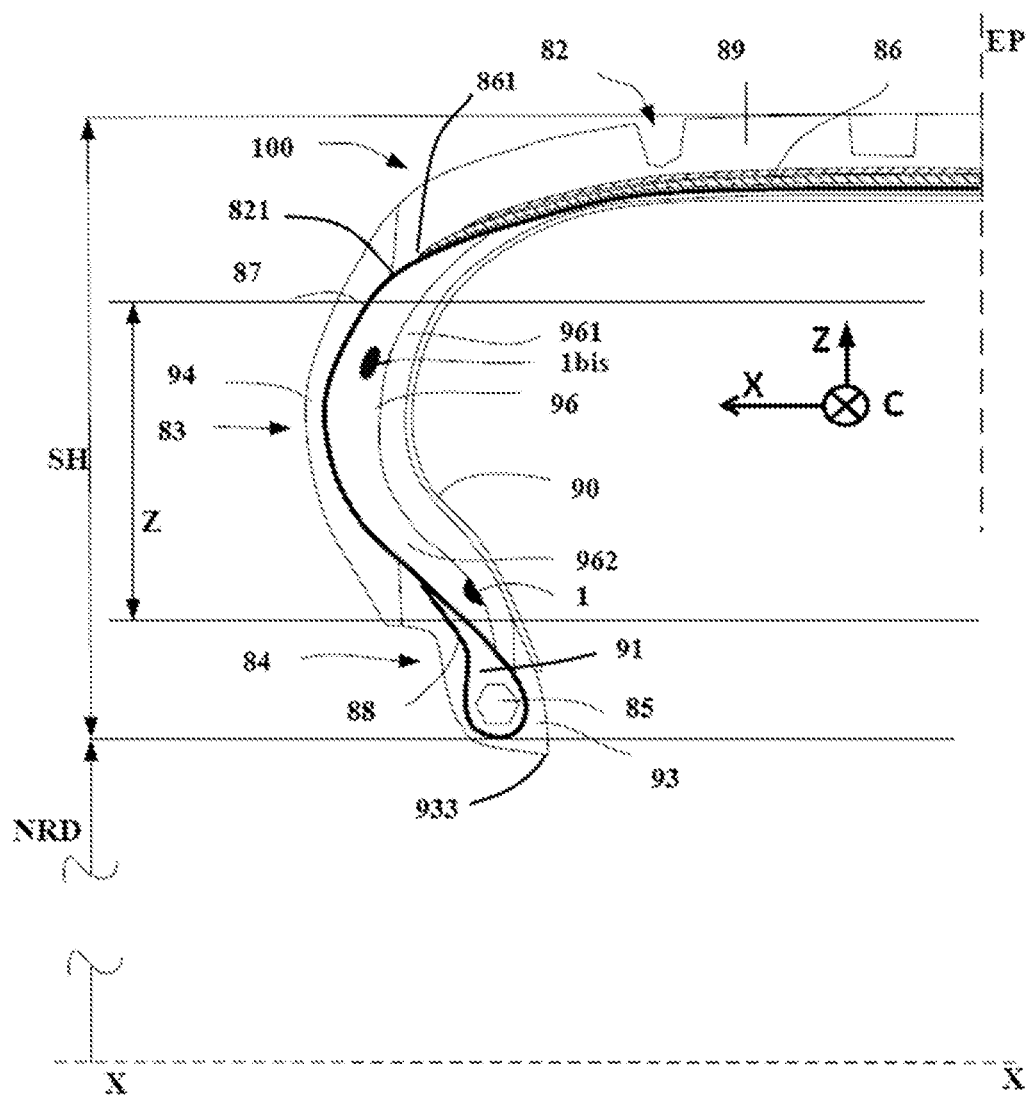
FIG. 11 is a view in meridian section of a tyre casing comprising a sidewall insert for running in extended mode and equipped with a passive radiofrequency transponder.

FIG. 11 is a partial axial sectional illustration of a tyre 100 capable of running flat and fitted with a passive radiofrequency transponder according to the invention. This FIG. 11 also gives the section height SH of the tyre casing 100, i.e. the radial distance between the nominal diameter of the mounting rim of the tyre NRD and the radially outermost portion of the tread 89 of the tyre casing 100. In the context of this document, the nominal diameter of the mounting rim of the tyre is taken to be the diameter of the tyre casing as indicated by the tyre size.

The tyre casing 100 is shown in the unconstrained state, i.e. not mounted on a rim and such that the width between the two beads 84 amounts to the width of the nominal ETRTO rim.

As regards the axial direction, what is meant by "axially external" is an axial direction directed towards the exterior of the tyre and by "axially internal" what is meant is an axial direction directed towards the median plane EP of the tyre casing 100.

The tyre casing illustrated in FIG. 11 is a tyre that is capable of running flat, but it is chosen purely by way of illustration and the passive radiofrequency transponder described may be incorporated within and on the surface of any type of tyre.

The half of the tyre 100 capable of running flat has a crown 82, delimited by an axial end 821 at each of its edges, which is reinforced by a crown reinforcement or belt 86 delimited by an axial end 861 at each of its edges, a sidewall 83 and a bead 84, the bead 84 being reinforced with a bead wire 85. The crown reinforcement 86 is surmounted radially on the outside by a tread 89 made of an elastomeric compound. A carcass reinforcement made up of a single carcass layer 87 is wound around the bead wire 85 in the bead 84, the turn-up 88 of this carcass layer 87 being arranged axially towards the outside of the tyre casing 100. In a manner known per se, the carcass layer 87 is made up of at least one ply reinforced by what are known as "radial" cords, for example here of textile, that is to say that these cords are disposed virtually parallel to one another and extend from one bead to the other so as to form an angle of between 80° and 90° with the median circumferential plane EP. An airtight inner liner 90 extends from one bead to the other radially internally with respect to the carcass reinforcement 87. The bead 84 comprises a second layer of elastomer compound (or "protector") 93 able to be in contact with the surface of a rim and ending with the end 933 that represents the radially interior end 841 of the bead 84. It also comprises a fourth layer of elastomer compound 91 extending radially externally relative to the bead wire 85.

The tyre 100 is able to run flat because of the presence of a sidewall insert 96 placed axially internally relative to the main part of the carcass reinforcement 87. This sidewall insert 96 allows the structure of the tyre to withstand the load at zero pressure. The order of magnitude of the extension modulus of a rubber for a sidewall insert is about twice the value of the modulus of a sidewall rubber or more.

The sidewall insert 96 of FIG. 11 comprises a first passive radiofrequency transponder 1 arranged at a radial distance D1 from the radially interior end 933 of the bead 84. The distance D1 must be larger than DO equal to 20 mm in order not to penalize the quality of communication between the passive radiofrequency transponder 1 and an external reader. This distance is greater than the height of a typical rim flange, which is 17.5 millimetres. Preferentially, the distance D1 is less than 50 millimetres.

The first passive radiofrequency transponder 1 is preferably placed within the semi-finished sidewall insert 96 before its incorporation within the green tyre casing 100.

In the example of FIG. 11, the sidewall insert 96 is made up of two rubber masses 961 and 962 which are axially adjacent to one another. The first passive radiofrequency transponder 1 is positioned at the interface between the two rubber masses 961 and 962.

This embodiment facilitates the precise and reproducible placement of the passive radiofrequency transponder 1 during the building of the tyre casing 100.

A second passive radiofrequency transponder 1bis is placed inside the rubber mass 962 via a slit on one of the surfaces of the rubber mass 962 that allows the passive radiofrequency transponder 1bis to be inserted into the rubber mass 962. This second embodiment makes the passive radiofrequency transponder easier to position with respect to the main part of the carcass reinforcing layer 87 as it is in contact with the rubber mass and makes the dielectric environment in the vicinity of the passive radiofrequency transponder 1bis more uniform, thereby improving the radiofrequency performance of said transponder, especially if the thickness of the electrical insulation device of the passive radiofrequency transponder 1bis is not at the threshold value. In addition, it is situated radially further out from the reference axis of revolution of the tyre casing 100.

FIG. 11 illustrates the region Z of the section height SH of the tyre casing 100, in which region it is preferable for the passive radiofrequency transponders 1 and 1bis to be positioned. This region Z extends from 20 to 70% of SH. The passive radiofrequency transponder 1 is placed at around 25% of SH, and the passive radiofrequency transponder 1bis at 60% of this parameter.

Figure 12:
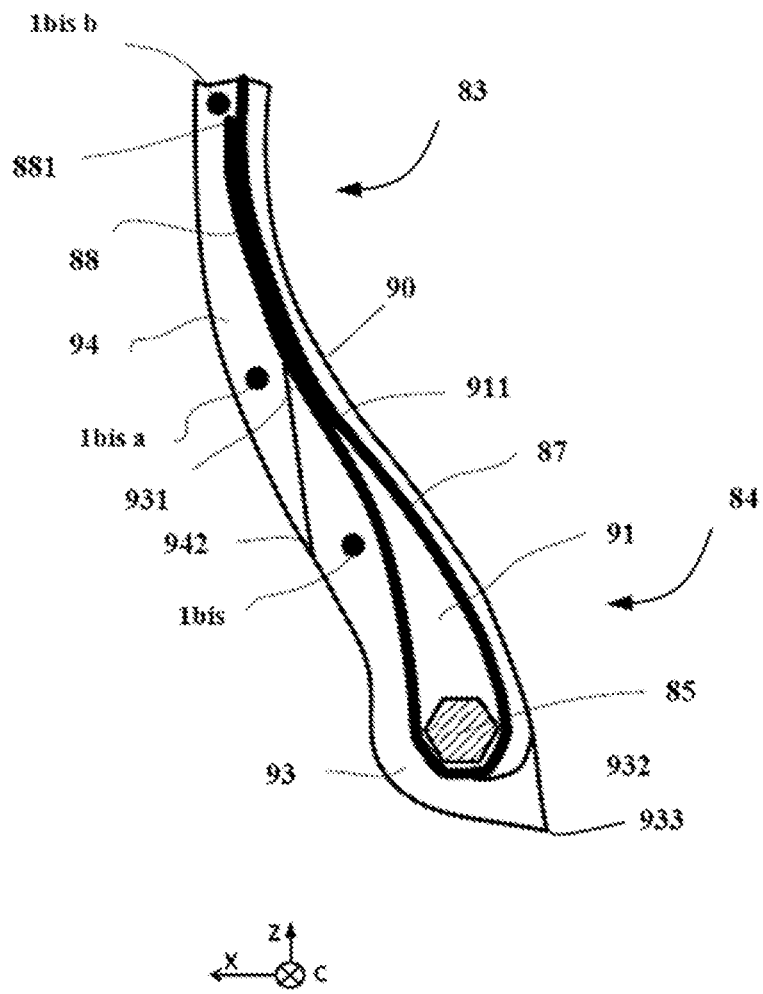
FIG. 12 is a view in meridian section of the bead and of a sidewall of a tyre casing according to the invention when the passive radiofrequency transponder is located in the interior region of the tyre casing.

FIG. 12 is an axial section of a tyre casing 100 in the region of the bead 84 and of the sidewall 83. The tyre casing comprises a crown block ending in a bead 84 at each of its axial edges by way of a sidewall 83.

FIG. 12 shows a bead 84 and a sidewall 83 of a tyre, chiefly for passenger vehicles. The carcass reinforcement, made up of a single carcass layer in FIG. 12, is anchored in the bead 84 by being turned up around the bead wire 85 in order to create a main part 87 and a turn-up 88 of the carcass reinforcement. The reinforcing filaments in the carcass layer are textile filaments. The fourth layer of elastomeric compound 91 separates the main part of the carcass reinforcement 87 from the turn-up 88. The turn-up 88 of the carcass reinforcement extends radially outwards in the region of the sidewall 83 beyond the radially exterior end 911 of the fourth layer of elastomer compound 91.

The second layer of elastomer compound 93, the layer that is in contact with the rim when the tyre casing is mounted thereon, and the third layer of elastomer compound 94 that forms the exterior surface of the tyre in the region of the sidewall 83, are in direct contact with the turn-up 88. There is no other fourth layer of elastomer compound. This bead 84 comprises a first passive radiofrequency transponder 1bis embedded in the second layer of elastomer compound 93 at a position that is radially exterior in relation to the bead wire 85, in a range spanning between 20 and 40 millimetres so as to be radially on the outside of the flange of the rim J once the tyre has been mounted, so as to ensure good communication between the radiofrequency transponder and an external reader.

This FIG. 12 also shows two alternative positions 1bis a and 1bis b in which the passive radiofrequency transponder is embedded in the third layer of elastomer compound 94. As before, these last two positions are rendered possible on account of the good mechanical strength of the passive radiofrequency transponder of the invention due to its miniaturization compared to solutions of the state of the art. All these positions are inside the tyre casing, axially on the outside of the end 933 of the second layer of elastomer compound which constitutes the interior end 841 of the bead 84.

It is also possible to position its radiofrequency transponders at the interface between the second layer of elastomer compound 93 and the turn-up 88 or the third layer of elastomer compound 94 and the turn-up 88 or the main part 87 of the carcass reinforcement. It is then essential to keep the cover filaments of the radiofrequency transponder away from the reinforcing elements in order to preserve the physical integrity of the radiofrequency transponder and/or that of the tyre casing. It is also advisable to keep the radiofrequency transponder at least 5 or even 10 millimetres away from the ends 931 of the layers of elastomer compounds 93 and 94 and from the end 881 of the turn-up 88 in order to preserve the physical integrity of the tyre casing.

Of course, the orientation of the radiating dipole antenna of the passive radiofrequency transponder with respect to the direction defined by the reinforcing elements of the main part of the carcass reinforcement can be any, provided that the projection of the radiating dipole antenna intercepts at least two reinforcing elements. As a result, what is meant by the distance between the end of a layer and the passive radiofrequency transponder is the distance of each material point of the passive radiofrequency transponder in each meridian plane of the tyre casing with respect to the end of the layer in the same meridian plane. What is meant by a passive radiofrequency transponder is that this transponder is potentially equipped with an encapsulating mass. However, it is more practical to position the passive radiofrequency transponder directly so that the first longitudinal axis is substantially perpendicular to the direction of the reinforcing elements of the main part of the carcass reinforcing layer.

Of course, if the reinforcing elements of the carcass reinforcement layer 8, and potentially the reinforcing elements of the reinforcing layers, are metallic in nature, it is necessary to guarantee an angle of at least 30 degrees, and preferably of at least 45 degrees, between the first longitudinal axis of the passive radiofrequency transponder and the direction of reinforcement defined by its reinforcement elements. In this way, the radiocommunication disturbances of the radiofrequency transponder are minimized. Ideally, in a tyre casing of the radial type with a single metallic carcass reinforcing layer, the angle between the first longitudinal axis of the radiofrequency transponder and the direction of reinforcement of the reinforcing layer is 90 degrees.

The invention claimed is:

1. A tire casing in a shape of a torus around a reference axis equipped with a passive radiofrequency transponder, the tire casing comprising:
    a crown block comprising a crown reinforcement having an axial end at each of its edges and a tread, joined at each of its axial ends to a bead having an inner end, located axially and radially on an inside of the bead with respect to the reference axis, via a sidewall;
    a carcass reinforcement, comprising at least one carcass reinforcement layer formed of reinforcing elements that are mutually parallel, the reinforcing elements defining a reinforcement direction, and which are inserted between two skim layers of elastomeric compound, the at least one carcass reinforcement layer being anchored in each of the beads by being turned up around an annular bead wire to form a main part of the at least one carcass reinforcement layer, extending from one bead wire to another bead wire and situated radially on an inside with respect to the crown block, and a turn-up of the at least one carcass reinforcement layer in each of the beads;

a second layer of elastomer compound forming an exterior surface of the tire casing in a region of the bead, the second layer of elastomer compound being intended to come into contact with a rim;

a third layer of elastomer compound situated radially on an outside in contact with the second layer of elastomer compound forming an exterior surface of the sidewall; and the passive radiofrequency transponder, comprising a main core defining a first longitudinal axis, a first primary cover filament wound in turns around the main core defining a winding diameter D and an electrical insulation device disposed radially on an outside of the first primary cover filament with respect to the first longitudinal axis, the first primary cover filament comprising at least two conductive filamentary elements having a diameter between 0.05 and 0.15 millimeters, galvanically connected to at least one electronic chip comprising a radiofrequency transmission-reception component, and the main core having a stiffness lower than a maximum stiffness of the first primary cover filament, wherein the electrical insulation device has a mean relative dielectric permittivity less than or equal to 10 over a thickness greater than or equal to one sixth of the winding diameter D of the first primary cover filament, wherein the passive radiofrequency transponder, in its longitudinal direction, is located in line with at least two reinforcing elements of the main part of the at least one carcass reinforcement layer, wherein the passive radiofrequency transponder is located axially on an outside of the inner end of the bead and radially between a radially outermost end of the bead wire and the axial end of the crown reinforcement, and wherein the thickness of elastomer compound separating an outer cover filament of the passive radiofrequency transponder, located radially outermost with respect to the first longitudinal axis, and the reinforcing elements is greater than 0.5 millimeters.

2. The tire casing according to claim 1, wherein the outer cover filament of the passive radiofrequency transponder is covered with an adhesion promoter promoting adhesion between the outer cover filament and elastomer compounds adjacent to the outer cover filament.

3. The tire casing according to claim 1, wherein the tire casing further comprises at least one fourth layer of elastomeric compound located axially on an outside of the main part of the at least one carcass reinforcement layer and axially on an inside of the second layer of elastomeric compound or the third layer of elastomeric compound.

4. The tire casing according to claim 1, wherein, with the tire casing further comprising at least one airtight layer of elastomer compound situated furthest toward an inside of the tire casing, the tire casing-further comprises at least a fifth layer of elastomer compound axially on an inside of the main part of the at least one carcass reinforcement layer.

5. The tire casing according to claim 1, wherein the tire casing further comprises at least one reinforcement layer which is formed of reinforcing elements inserted between two skim layers of rubber compound.

6. The tire casing according to claim 1, wherein, with the reinforcing elements of the at least one carcass reinforcement layer being metallic, the first longitudinal axis of the passive radiofrequency transponder forms an angle of at least 45 degrees with a direction of reinforcement of the at least one carcass reinforcement layer.

7. The tire casing according to claim 1, wherein, with the first primary cover filament comprising a non-stretch tertiary core, arranged collinearly with the at least two conductive filamentary elements and with the at least one electronic chip, and at least one tertiary cover filament wound in turns around the non-stretch tertiary core, the at least two conductive filamentary elements and the at least one electronic chip, the non-stretch tertiary core has a stiffness greater than a maximum stiffness of each conductive filamentary element.

8. The tire casing according to claim 1, wherein, with one of the conductive filamentary elements being galvanically connected to an end of a third conductive filamentary element, another end of which is galvanically connected to the at least one electronic chip in order to form a closed loop, parts of the conductive filamentary elements forming the closed loop and the at least one electronic chip are electrically insulated.

9. The tire casing according to claim 1, wherein the electrical insulation device of the passive radiofrequency transponder comprises at least one secondary cover filament wound in turns around a secondary core, the main core and the first primary cover filament, the secondary core being collinear with the main core.

10. The tire casing according to claim 1, wherein a length L of helical twisting of the first primary cover filament of the passive radiofrequency transponder along a first main axis is between 30 and 80 millimeters.

11. The tire casing according to claim 1, wherein a diameter of the conductive filamentary elements is between 0.08 and 0.11 millimeters.

12. The tire casing according to claim 1, wherein the passive radiofrequency transponder is situated at an interface defined by at least a surface of a layer of elastomer compound of the tire casing.

13. The tire casing according to claim 12, wherein, with the interface being defined by another layer of elastomer compound or a reinforcement layer, the passive radiofrequency transponder is situated at a distance of at least 5 millimeters from ends of layers of elastomer compound at the interface.

14. The tire casing according to claim 1, wherein the passive radiofrequency transponder is situated on an inside of a layer of elastomer compound of the tire casing.

15. The tire casing according to claim 14, wherein the first longitudinal axis of a radiating antenna of the passive radiofrequency transponder is perpendicular to the thickness of the layer of elastomer compound.

* * * * *